(12) United States Patent
Clark

(10) Patent No.: US 11,235,534 B2
(45) Date of Patent: Feb. 1, 2022

(54) FIXTURES FOR INDUSTRIAL TOOLING

(71) Applicant: Clark Fixture Technologies Inc., Bowling Green, OH (US)

(72) Inventor: Thomas R. Clark, Bowling Green, OH (US)

(73) Assignee: Clark Fixture Technologies Inc., Bowling Green, OH (US)

( * ) Notice: Subject to any disclaimer, the term of this patent is extended or adjusted under 35 U.S.C. 154(b) by 0 days.

(21) Appl. No.: 17/150,223

(22) Filed: Jan. 15, 2021

(65) Prior Publication Data

US 2021/0283857 A1    Sep. 16, 2021

Related U.S. Application Data

(60) Provisional application No. 63/057,078, filed on Jul. 27, 2020, provisional application No. 62/988,001, filed on Mar. 11, 2020.

(51) Int. Cl.

| | | |
|---|---|---|
| *B29C 64/40* | (2017.01) | |
| *B33Y 10/00* | (2015.01) | |
| *B29C 64/245* | (2017.01) | |
| *B29C 64/209* | (2017.01) | |
| *B33Y 50/02* | (2015.01) | |
| *B29C 64/118* | (2017.01) | |
| *B29C 64/188* | (2017.01) | |
| *B33Y 40/20* | (2020.01) | |
| *B33Y 80/00* | (2015.01) | |
| *B29C 64/393* | (2017.01) | |

(52) U.S. Cl.
CPC ............ *B29C 64/40* (2017.08); *B29C 64/118* (2017.08); *B29C 64/188* (2017.08); *B29C 64/209* (2017.08); *B29C 64/245* (2017.08); *B29C 64/393* (2017.08); *B33Y 10/00* (2014.12); *B33Y 40/20* (2020.01); *B33Y 50/02* (2014.12); *B33Y 80/00* (2014.12)

(58) Field of Classification Search
None
See application file for complete search history.

(56) References Cited

U.S. PATENT DOCUMENTS

| | | |
|---|---|---|
| 2,500,802 A | 3/1950 | Clark |
| 6,363,602 B1 | 4/2002 | Clark |
| 9,230,044 B1 * | 1/2016 | McKendrick ........... G06F 30/00 |
| 9,939,245 B1 | 4/2018 | McKendrick |
| 10,168,133 B2 | 1/2019 | McKendrick |
| 10,272,613 B2 | 4/2019 | Boyd, IV |
| 2016/0263822 A1 * | 9/2016 | Boyd, IV ................ B29C 64/20 |

* cited by examiner

*Primary Examiner* — Monica A Huson
*Assistant Examiner* — Kelsey C Grace
(74) *Attorney, Agent, or Firm* — MacMillan, Sobanski & Todd, LLC

(57) ABSTRACT

Fixtures for industrial tooling that may be made by additive manufacturing techniques, and systems and methods for making the same, are described. A fixture for industrial tooling may include a plurality of support columns that defines an intermediate area having at least 10% empty space between a contoured surface and a base structure. The fixtures may be made through a draping method instead of a slicing technique. A fixture for industrial tooling may alternatively be made by applying an extruded layer over a core of foam, balsawood, or other lightweight material, through a non-slicing process.

10 Claims, 24 Drawing Sheets
(5 of 24 Drawing Sheet(s) Filed in Color)

FIXTURES FOR INDUSTRIAL TOOLING

RELATED APPLICATIONS

This application claims priority to U.S. Provisional Application No. 63/057,078, filed under 35 U.S.C. § 111(b) on Jul. 27, 2020, as well as U.S. Provisional Application No. 62/988,001, filed under 35 U.S.C. § 111(b) on Mar. 11, 2020. The entire disclosures of all the aforementioned applications are incorporated herein by reference for all purposes.

BACKGROUND

Fixtures for industrial tooling that are currently made by 3D printing rely on a slicing (i.e., planar or single-plane) technique. Slicing is currently the foundation and basic method used to conduct 3D printing. The majority of 3D printing software for converting a 3D object model to specific instructions for the printer is slicing software. With slicing software, an object is divided into a stack of flat layers, which are formed by linear movements of the 3D printer extruder following some specific printer commands such as to control the extruder temperature. In a slicing technique, material is extruded in the X, Y plane, then the extruder moves up one layer in the z-axis and back across the X, Y plane again, slowly building up the required shape layer by layer, or slice by slice. However, slicing results in inaccuracies in the produced fixture. Generally, the inaccuracies relate to thermal issues when a plastic or any material is melted and then cools. Additionally, almost all 3D printed processes use a heated platen as a base build platform. Material is then built upon that layer by layer until complete. This creates three temperature zones. The first is a continual heat zone decreasing from the platen up several layers, decreasing until the temperature reaches the ambient temperature of the heated built chamber, which is the second zone. The third zone is the temperature of the deposition as it is laid upon the previous layer. These thermal issues create inaccuracies of a somewhat unpredictable nature.

Furthermore, current techniques to make fixtures by 3D printing use more material and take longer than desired. It would be advantageous to cut down on the amount of material and time needed to 3D print fixtures.

There is a need in the art for new and improved fixtures for industrial tooling that may be made by additive manufacturing techniques.

SUMMARY

Provided is a fixture for industrial tooling comprising a base structure, a contoured surface, and a plurality of support columns extending from the base structure to the contoured surface, wherein the plurality of support columns forms an intermediate area between the base structure and the contoured surface having at least 10% empty space.

Further provided is a method for producing a fixture for industrial tooling, the method comprising extruding a base structure, a plurality of support columns on the base structure, and a contoured surface on the plurality of support columns to form a fixture, wherein the plurality of support columns defines an intermediate area between the base structure and the contoured surface having at least 10% empty space; and machining the fixture to within a desired tolerance to produce a fixture for industrial tooling. The plurality of support columns may be produced through an extrusion method that is not a slicing technique.

Further provided is a method for producing a fixture for industrial tooling, the method comprising extruding a base structure, a plurality of support columns on the base structure, and a contoured surface on the plurality of support columns to form a fixture, wherein the plurality of support columns defines an intermediate area between the base structure and the contoured surface having at least 10% empty space; and machining the fixture to within a desired tolerance to produce a fixture for industrial tooling.

Further provided is a method of additive manufacturing, the method comprising extruding a first support column on a base structure with a polymer through a single vertical path of an extruder, wherein either (a) the extruder dwells at a top of the first support column for a sufficient time to allow the extruded polymer to cool to an extent such that the first support column is capable of supporting itself, or (b) an air spray is utilized to cool the extruded polymer to an extent such that the first support column is capable of supporting itself; and draping the polymer with the extruder from the first support column to a second support column, leaving an empty space between the first support column and the second support column.

Further provided is a method of additive manufacturing, the method comprising extruding a plurality of support columns including at least a first support column on a base structure and a second support column on the base structure, wherein the first support column is at a distance from the second support column; draping a connecting line of material from a top of the first support column to a top of the second support column, wherein the connecting line of material is draped over empty space for the distance; and draping or bridging further lines of material in a manner substantially perpendicular to the connecting line to form a shell supported by the plurality of support columns.

Further provided is a system for producing a fixture for industrial tooling, the system comprising a computer a robot or machining center, wherein the robot or machining center is communicatively coupled to the computer and is configured to switch between two or more functionalities selected from the group consisting of extruding, milling, spray paining, laser scanning, painting, scribing (for example, with a laser or scribe tool), and inspecting (for example, with a scanner or touch probe).

Further provided is a system for producing a fixture for industrial tooling, the system comprising a first station comprising a robotic extruder, a second station comprising a machining tool, and a computer communicatively coupled to the robotic extruder and the machining tool configured to control the robotic extruder and the machining tool.

Further provided is a fixture or tool comprising a core having a contoured surface, and an extruded layer on the core, where the extruded layer forms a surface that conforms to the contoured surface of the core. In certain embodiments, the core comprises a foam, balsa, or other suitable material. In certain embodiments, the extruded layer comprises ABS with an additive or other suitable extruded material such as an algae-based polymer. In particular embodiments, the additive is carbon fiber or fiber glass. In certain embodiments, the extruded layer is machined to a desired tolerance.

Further provided is a method for manufacturing a fixture or tool, the method comprising providing a core having a shape conforming to a desired part, undersized relative to a size of the desired part, and extruding a layer of material on the core through a non-slicing process to form an extruded layer having the shape of the desired part. In certain embodiments, the core is removable from the extruded layer, providing a thin, light-weight, strong shell with a machined surface. In certain embodiments, the extruded layer is oversized relative to the size of the desired part, and the method further comprises machining the extruded layer to within a desired tolerance. In certain embodiments, the method further comprises applying a separator on top of the core before the extruding, wherein the core is removable from the extruded layer. In particular embodiments, the separator comprises a liquid vinyl or other brushed or sprayed-on product. In certain embodiments, the core comprises a foam, balsa, or other suitable material. In certain embodiments, the extruded layer comprises ABS with an additive or other suitable extruded material such as an algae-based polymer. In particular embodiments, the additive is carbon fiber or fiber glass. In particular embodiments, the core comprises a foam or balsawood, and the extruded layer comprises acrylonitrile butadiene styrene (ABS) with a carbon fiber or fiber glass additive, an algae-based polymer, or other extrudable material.

BRIEF DESCRIPTION OF THE DRAWINGS

The patent or application file may contain one or more drawings executed in color and/or one or more photographs. Copies of this patent or patent application publication with color drawing(s) and/or photograph(s) will be provided by the U.S. Patent and Trademark Office upon request and payment of the necessary fees.

FIG. 7A depicts the draping of extruded material from the top of one support column to the top of another support column, and FIG. 7B depicts the formation of a shell of the contoured surface from an extruded grid of material.

DETAILED DESCRIPTION

Figure 1A:
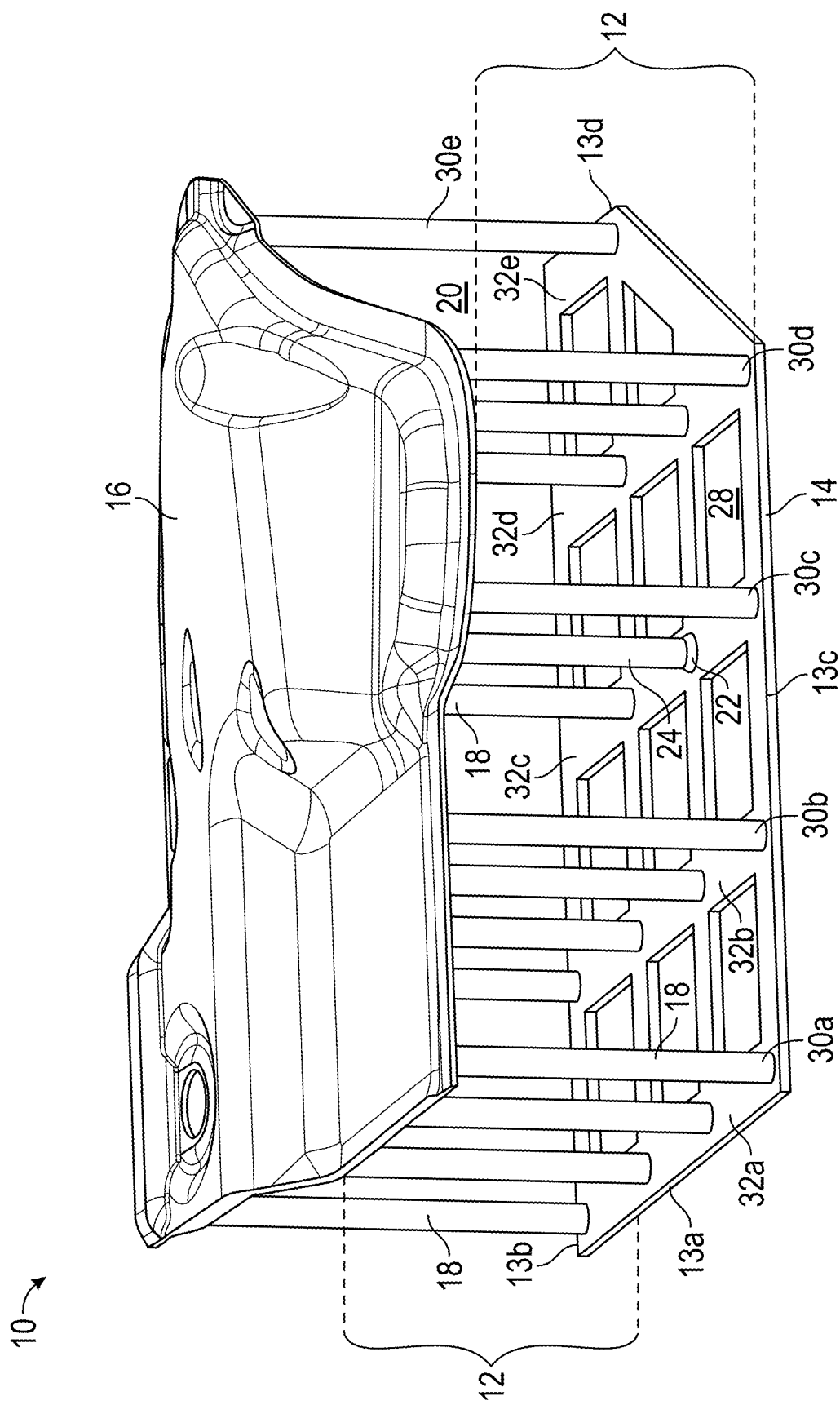
FIGS. 1A-1B: Perspective (FIG. 1A) and side (FIG. 1B) views of an embodiment of a fixture for industrial tooling with straight columns.

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

Provided herein are fixtures for industrial tooling having support columns made by additive manufacturing techniques that do not involve slicing. Rather, the fixtures for industrial tooling may be made by a non-planar or multi (more than 2) axis printing technique that involves moving directly up the z-axis, not back and forth and not restricted to the X,Y plane, at the same rate as the material is extruded, thus preventing stretching or bulging of the columns. The extruder may dwell for a time period to allow the column material to chill off to the degree required to support itself. Alternatively or in addition to dwelling, a cooling air spray may be applied after the nozzle to allow the column material to chill off to the degree required to support itself. Then, the extruder may move to the next column's location. This is much faster, and uses less material, than conventional additive manufacturing techniques that utilize a slicing method, with a support material that requires post removal. With columns instead of slicing plies, there is less material used and less time spent using it, and there is no need to post-process the removal of material used only to build the part and later require removal.

In some embodiments, fixtures may be created by building columns in space without additional or previous support. A shell may be created by draping material from one point through an open space to another point. A line of material is draped or bridged across and connecting each support column, then in a somewhat perpendicular direction to the support column connecting line, a shell of a contoured surface is built by draping or bridging across the column top line progressive parallel and touching extruded lines creating a complete surface without gaps (unless gaps are required by the design). The contoured surface may be further processed as desired.

Referring generally to FIGS. 1-6, provided herein are fixtures 10, 110, 210, 310, 410, 510 for industrial tooling that can be produced by additive manufacturing more efficiently while avoiding some of the inaccuracies of conventional fixtures produced by 3D printing. The fixtures 10, 110, 210, 310, 410, 510 may include an intermediate area 12, 112, 212, 312, 412, 512 having support columns 18, 118, 218, 318, 418, 518 and that includes empty space 20, 120, 220, 320, 420, 520 so as to limit the amount of material needed to manufacture the fixtures 10, 110, 210, 310, 410, 510. The empty space 20, 120, 220, 320, 420, 520 may also be referred to as interstitial spaces. In some embodiments, the interstitial spaces are completely empty (i.e., void of any filler or other material).

Figure 1B:
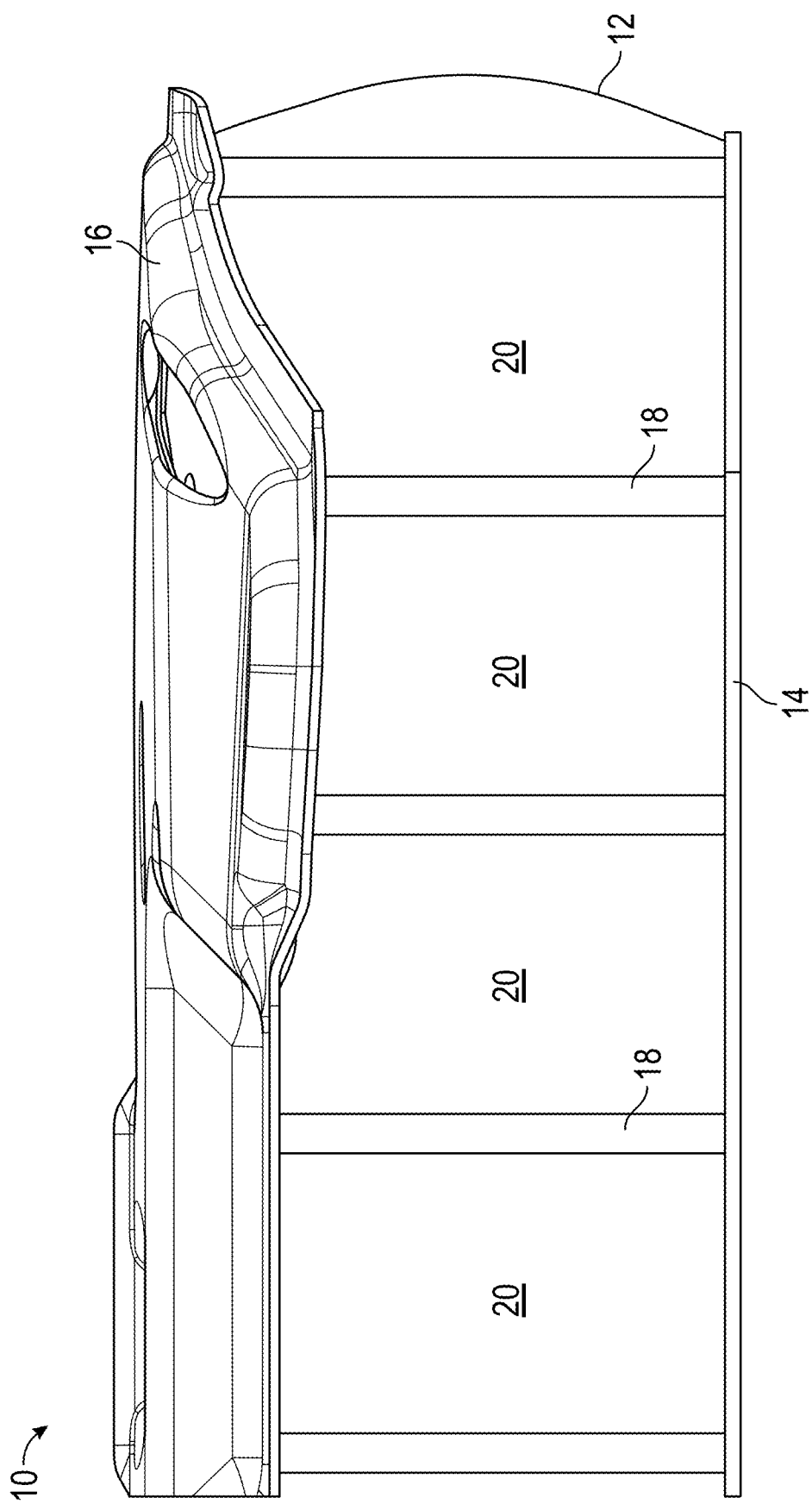

Referring now to FIGS. 1A-1B, a non-limiting example embodiment of a fixture 10 may include a base structure 14, a contoured surface 16, and a plurality of support columns 18 extending from the base structure 14 to the contoured surface 16. In this embodiment, the support columns 18 do not intersect one another. Rather, one end of each support column 18 is attached to the base structure 14, and the other end of each support column 18 is attached to the contoured surface 16. The support columns 18 provide structural support for the contoured surface 16. The plurality of support columns 18 defines an intermediate area 12 within the confines of the fixture 10 between the contoured surface 16 and the base structure 14. The base structure 14 forms a structural base from which the support columns 18 may extend, such as in an upright manner. The shape of the base structure 14 may mimic the outline of the contoured surface 16, but does not need to. The base structure 14 may be substantially planar. However, it is not necessary that the base structure 14 be planar. Furthermore, it is not necessary that the support columns 18 be vertical or even substantially vertical relative to the base structure 14. As discussed in more detail below, in some embodiments, the support columns 18 are not vertical relative to the base structure 14. In use, the base structure 14 may rest on a level surface and the contoured surface 18 may serve as a mechanism for holding, checking, or otherwise receiving a part or tool. For example, the fixture 10 may be used to check a part against a reference standard, i.e., to check whether a part has been manufactured to within one or more tolerances.

The contoured surface 16 may include any number or configuration of slots, recesses, grooves, bumps, ridges, trenches, canals, cuttings, depressions, gutters, framework, creases, crimps, constructs, texturing, or other surface modifications. The geometry of the contoured surface 16 is customized for the desired purpose of the fixture 10, and is not particularly limited. In general, though, the contoured surface 16 is suitable for receiving a part or tool. The contoured surface 16 may be formed from any suitable polymer. In one non-limiting example, the contoured surface 16 is formed from acrylonitrile butadiene styrene (ABS) with an additive such as, but not limited to, carbon fiber or fiber glass. However, other polymers are possible and encompassed within the scope of the present disclosure.

The support columns 18 may be formed from any suitable polymer. In one non-limiting example, the support columns 18 are formed from ABS, optionally with an additive such as, but not limited to, carbon fiber or fiberglass. The intermediate area 12, defined by the peripheral edges 13a, 13b, 13c, 13d of the fixture 10 between the contoured surface 16 and the base structure 14, includes empty spaces 20, which may also be referred to as interstitial spaces. The intermediate area 12 has a volume that is at least 10% empty space 20. That is, the density of support columns 18 in the intermediate area 12 is no greater than about 90% by volume. In other words, at least about 10% of the volume defined by the intermediate area 12 of the fixture 10 between the contoured surface 16 and the base structure 14 is empty space 20. In some embodiments, at least about 20% of the volume defined by the intermediate area 12 of the fixture 10 between the contoured surface 16 and the base structure 14 is empty space 20. In some embodiments, at least about 30% of the volume defined by the intermediate area 12 of the fixture 10 between the contoured surface 16 and the base structure 14 is empty space 20. In some embodiments, at least about 40% of the volume defined by the intermediate area 12 of the fixture 10 between the contoured surface 16 and the base structure 14 is empty space 20. In some embodiments, at least about 50% of the volume defined by the intermediate area 12 of the fixture 10 between the contoured surface 16 and the base structure 14 is empty space 20. In some embodiments, at least about 60% of the volume defined by the intermediate area 12 of the fixture 10 between the contoured surface 16 and the base structure 14 is empty space 20. In some embodiments, at least about 70% of the volume defined by the intermediate area 12 of the fixture 10 between the contoured surface 16 and the base structure 14 is empty space 20. In some embodiments, at least about 80% of the volume defined by the intermediate area 12 of the fixture 10 between the contoured surface 16 and the base structure 14 is empty space 20. In some embodiments, the empty space 20 is not filled with any filler or other material. The partially hollow nature of the intermediate area 12 allows for less material being needed to manufacture the fixture 10 and less time needed to deposit the material, and produces a lighter weight finished product, while still providing the requisite support needed for the contoured surface 16, and while being capable of being produced through a robotic additive manufacturing technique.

The support columns 18 may or may not be uniformly spaced apart in the intermediate area 12. In some embodiments, the support columns 18 are positioned as minimally required to support the specific geometry of the contoured surface 16. In other words, the number and relative positioning of support columns 12 may be based on the minimal amount of structural support needed by the particular contoured surface 16.

Figure 7A:
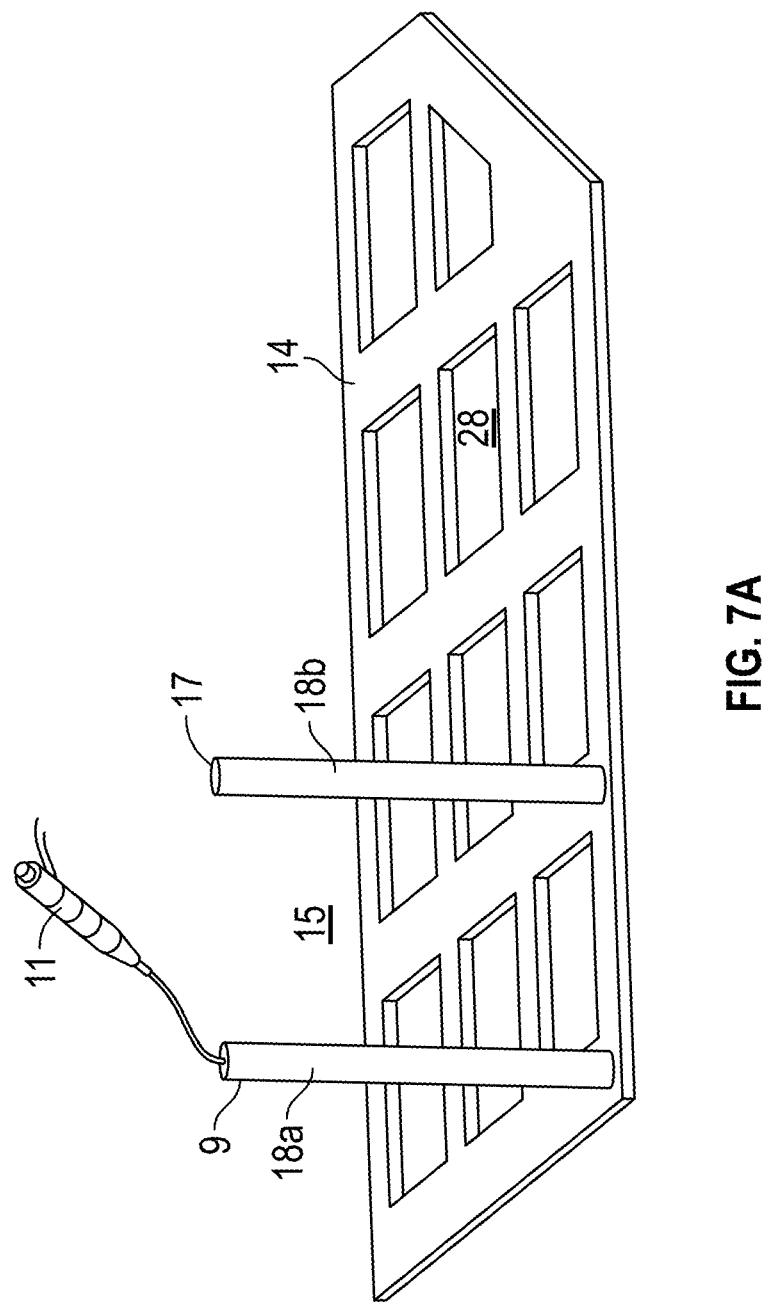
FIGS. 7A-7B: Illustrations of a draping process used to create a contoured surface on the support columns of a fixture for industrial tooling in accordance with the present disclosure.
Figure 7B:
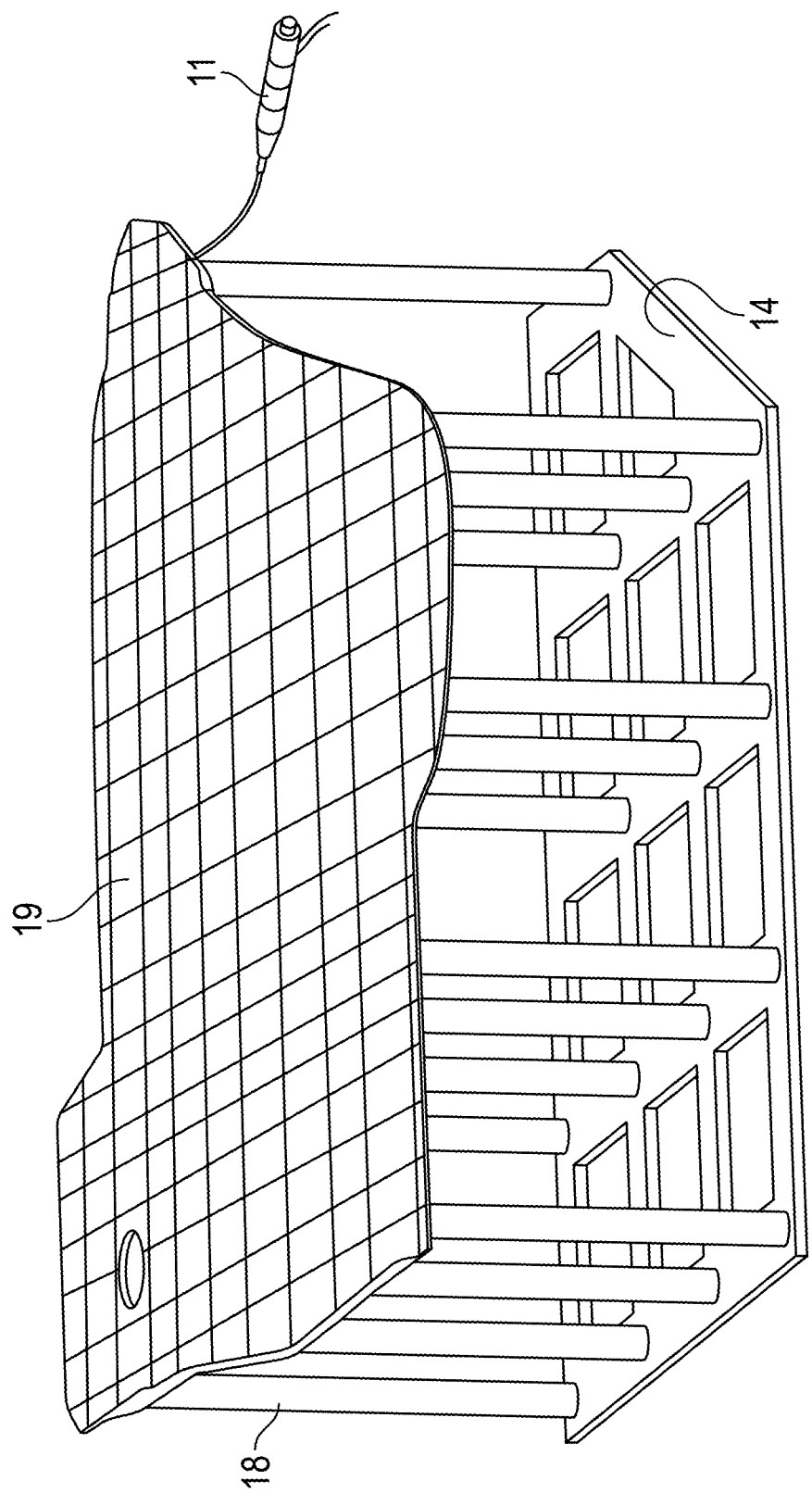

Referring now to FIGS. 7A-7B, to create the support columns 18 and the contoured surface 16, a draping method may be employed instead of a slicing technique. In contrast to slicing, the polymer material can be draped by an extrusion nozzle 11 from the top 9 of one support column 18a across an open area 15 and attached to the top 17 of another support column 18b to form a connecting line between the support columns 18a, 18b. Further lines of material may be draped in a manner substantially perpendicular to the connecting line, which creates an umbrella or shell 19 of the working surface supported in a predetermined orientation by the plurality of support columns 18. This also leaves an opening below the drape, which remains as empty space 20 in the final fixture 10. In certain areas, it may be important to use two or more layers of drape to properly match a desired surface due to the cord height or sag of the drape.

In contrast, to build columns through slicing, the extrusion nozzle 11 would deposit material back and forth in short moves moving up in the z-axis after each small deposit. However, advantageously, the use of a draping method instead of slicing results in the production of parts while using less material compared to a slicing method. With the draping method, the reduced amount of material results in a reduced build time and weight of the fixture, which all sums up to reduced cost, faster delivery time, and lighter finished fixtures.

Furthermore, when open lattice structures are conventionally created by slicing methods, a secondary material is often printed where the void will eventually be to support the cantilevered extrusion until it is solid, and after printing, the secondary material is washed out by various processes. Typically, the extrusion or deposition method involves depositing a short line of the final material, then switching nozzles and depositing a short line of washable secondary material, and this process continues in the X,Y plane until completing that layer, or slice, at which point the nozzle moves up in the z-axis one level and the process is repeated on top of the previous slice. When completed, the washable secondary material is removed, and the finished part is cleaned. However, this washout is time-consuming and messy. The present disclosure provides for the production of fixtures having open lattice structures without the need for such a washout structure. Rather, an open lattice structure can be extruded from a single material through the draping method described herein, and no washout step is needed. Consequently, when the extruder is finished, the fixture may be complete without further modifications or steps necessary.

Referring again to FIGS. 1A-1B and 7A-7B, each support column 18 may be extruded vertically without the support of any preceding elements or structures. The support columns 18 need not be built by slicing or piling layer upon layer, but, rather, can be created by a single vertical move by an extruder. As discussed in more detail below, the extruder may be a robotic extrusion device operating on the basis of pre-programmed computer instructions.

One of the support columns 18a can be the first structural member upon which additional extrusions can be hung or draped. To create a support column 18 in space, an extrusion nozzle 11 may both extrude the hot fragile material and support it momentarily until the material has chilled enough to support itself, or the cooling of the material may be forced through a cool air spray or other suitable cooling means. Then, the extrusion nozzle 11 can proceed to the location of the next support column 18b. The nozzle 11 of the extruder may be any desired shape and size. For example, the nozzle 11 may be round, oval, square, or star-shaped. In some embodiments, such as a star shape, the nozzle 11 may be capable of forming support columns 18 without needing to significantly dwell atop the support column 18 in order to allow sufficient chilling of material such that the support column 18 can support itself. This is because a star-shaped nozzle may form a star-shaped cross-sectional support column 18 where the corners chill faster than the remaining extruded material, and may chill fast enough to not require a dwell time by the extruder.

Figure 10A:
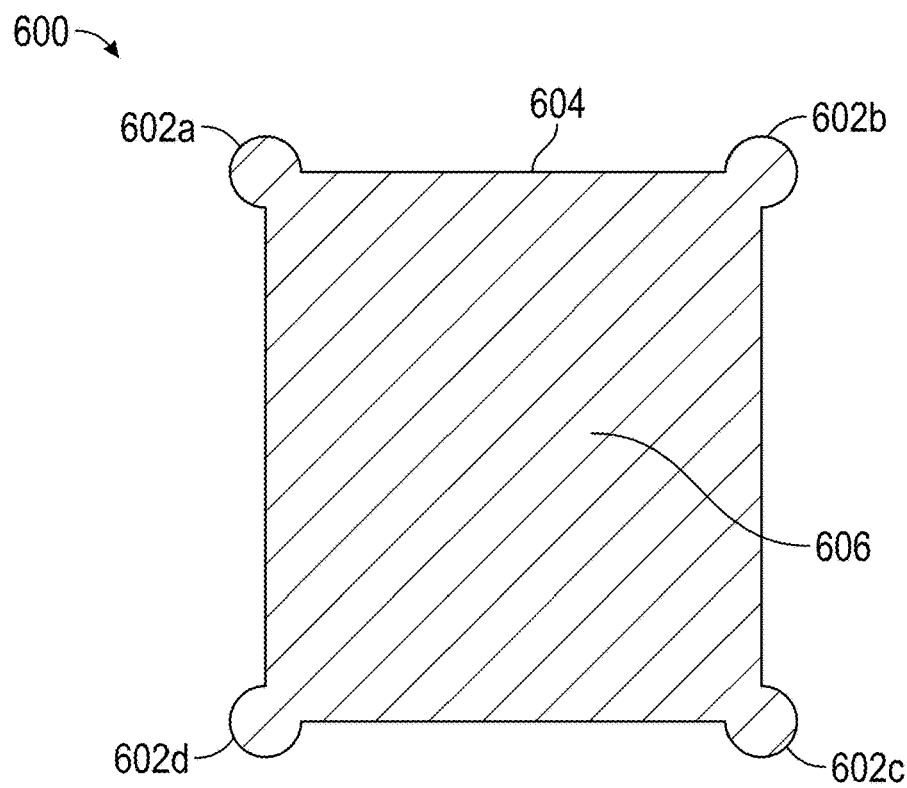
FIGS. 10A-10B: Non-limiting examples of cross sectional shapes for an extrusion nozzle usable in accordance with the present disclosure.
Figure 10B:
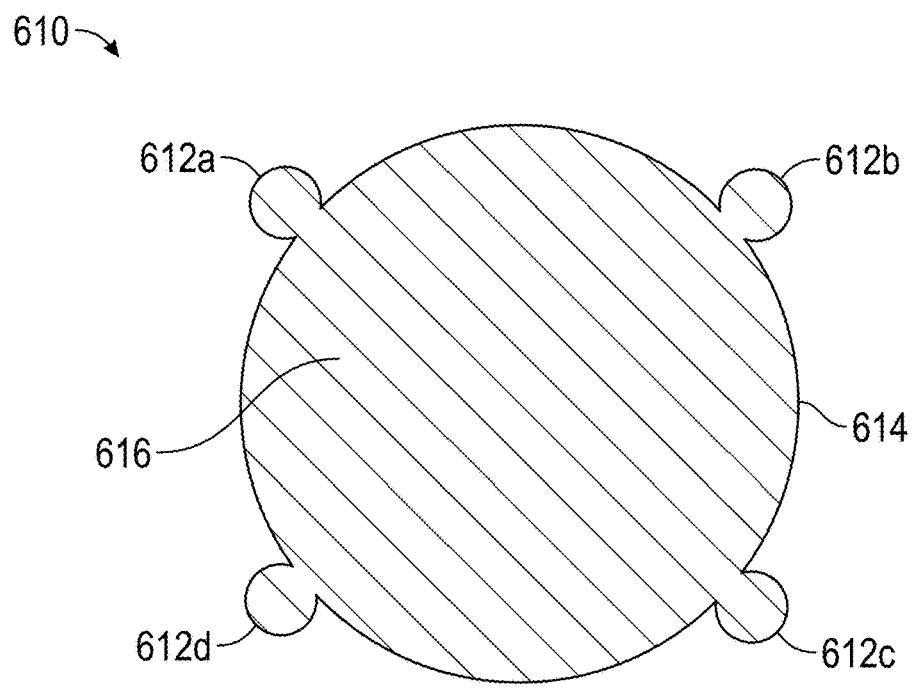

FIGS. 10A-10B show cross sections of two non-limiting example nozzle configurations. Referring now to FIG. 10A, a nozzle cross section 600 may have tabs or ears 602a-602d on a square 604. The square 604 has a center area 606. Referring now to FIG. 10B, a nozzle cross section 610 may have tabs or ears 612a-612d on a circle 614. The circle 614 has a center area 616. In either case, the configuration of the cross section 600, 610 allow for the extruded material in the tabs or ears 602a-602d, 612a-612d to cool first and provide quick support as well as leaving the center area 606, 616 somewhat soft to receive bridging or draping lines of material. However, other nozzle configurations are possible and entirely encompassed within the scope of the present disclosure.

The extrusion nozzle 11 can begin the column extrusion at the designated location on the base structure 14. The extrusion nozzle 11 may begin the extrusion and move vertically up in the z-axis at the rate the polymer is extruding. This prevents bulging if moving too slowly, or stretching if moving too quickly. Once the desired z-axis height is reached, the extrusion can be turned off but the extrusion nozzle 11 can be caused to dwell in place at the top of the support column 18 until a sufficient time has elapsed so as to allow the polymer to cool to the degree that it can support itself, or the polymer may be actively cooled through a cool air spray or other suitable cooling means. Thus, each support column 18 is not created by layering, but, rather, is created by a single vertical path. It is also possible to develop a continuous flow without dwelling, as discussed above, for example by using certain shapes of nozzles and, when required, optional air cooling.

The draping process described herein is the horizontal, or at least non-90-degree, extrusion moving from one connected point through space to another fixed point. Referring again specifically to FIGS. 7A-7B, this process may be employed, for example, in the building of the contoured surface 16, where the extrusion nozzle 11 may move from the top 9 of one support column 18a, bridging the open area 15, to the top 17 of another support column 18b. This creates a linear grid with the centerline to centerline distance being a similar distance as the spacing of the support columns 18. An additional, more complete layer is draped perpendicularly to this grid line, each line adjacent and parallel to the preceding perpendicular line, creating a complete void-less surface. A shell 19 of the contoured surface 16 is thus built by draping or bridging across the column top line progressive parallel and touching extruded lines, creating a complete surface without gaps, unless gaps are required by the design of the contoured surface 16. In cases in which the drape in some areas of this surface is lower than the expected machining depth, such as if the drape is sagging too much (i.e., has too large of a cord height), another layer of the bridging line may be added.

Building layer upon layer exacerbates the inaccuracies inherent in the thermal process of extruding hot material. The three dimensional distortions are neither predictable nor repeatable. The degree of these deviations are satisfactory for some products but generally outside the tolerance requirements for most industrial tooling. Additionally, the non-repeatable, general unpredictability makes the layering method suspect and less than suitable for industrial tooling. The layer or slicing method builds significant plies of material required only for the purpose of building the part or tool, and has little value to the finished product. The extra material creates not only additional material cost, but also the cost to produce it and sometimes further cost to remove it. Thus, cost savings can be realized from utilizing the draping method described herein. In some embodiments, a 98% volumetric savings can be realized from a column structure built as described herein compared to a slicing/layering method.

Referring again to FIGS. 1A-1B, a bead (or puddle) 22 of material may be formed at a foot section 24 of one or more of the support columns 18, where the support column 18 meets the base structure 14. The bead 22 of material serves to provide good adhesion, as well as suitable thermal conditions, between the support column 18 and the base structure 14 during manufacturing. The bead 22 of material may be the same material as the support columns 18, or may alternatively be any suitable polymer. In one non-limiting example, the bead 22 extends for a height above the base structure 14 of about one-eighth of an inch, and completely encircles the foot section 24 of a support column 18. However, other dimensions of the bead 22 are possible and encompassed within the scope of the present disclosure. Though FIG. 1A depicts only one support column 18 having such a bead 22, any or all of the support columns 18 may include such a bead 22. Furthermore, in some embodiments, none of the support columns 18 includes such a bead 22. Furthermore, a similar bead of material may be located at any point where any two extruded features connect, such as where a draping line connects at the top of the support column 18, i.e., where a support column 18 meets the contoured surface 16.

In the embodiment depicted in FIGS. 1A-1B, the base structure 14 forms a horizontal surface, and the support columns 18 are substantially orthogonal to the horizontal surface. However, it is not necessary that the base structure 14 form a horizontal surface or that the support columns 18 be substantially orthogonal to the horizontal surface. The base structure 14 may include openings 28 to save on material cost, but in any event forms a structurally stable base for the fixture 10 that may rest on a level surface. The base structure 14 may be formed from any suitable polymer. In one non-limiting example, the base structure 14 is formed from ABS without carbon fiber. In other embodiments, the base structure 14 is formed from ABS with an additive such as, but not limited to, carbon fiber or fiber glass. However, other polymers are possible and encompassed within the scope of the present disclosure.

The support columns 18 may be arranged in a pattern of rows 30a, 30b, 30c, 30d, 30e having evenly spaced-apart support columns 18. The column placement is dependent on the surface geometry of the contoured surface 16 the support columns 18 are supporting. For instance, support columns 18 may be needed at all major changes in the surface in height (i.e., along the Z-axis), which provides for a more even surface deposition and translates to less machining. As seen in FIG. 1A, there may be a row 30e of only one support column 18. The pattern and arrangement of support columns 18 generally depends on the geometry of the contoured surface 16 which, as described above, is customizable based on the desired purpose of the fixture. As further seen in FIG. 1A, the base structure 14 may include interconnected strips 32a, 32b, 32c, 32d, 32e of material underlying the rows 30a, 30b, 30c, 30d, 30e of support columns 18, and openings 28 therebetween so as to save on material costs. As seen from FIGS. 1A-1B, the rows 30a, 30b, 30c, 30d, 30e of support columns 18 may be parallel to one another. However, this configuration is merely one non-limiting example, and other configurations are possible and encompassed within the scope of the present disclosure. For example, the support columns 18 do not need to be evenly spaced apart, and the base structure 14 does not need to include openings 28. The style, size, height, and location of the support columns 18, as well as the drape levels and height and the dwell time for an extruder are variables that may be tailored and customized for the desired use of the fixture 10. Once such variables are determined for a given fixture 10, the production process can be highly automated.

Figure 2A:
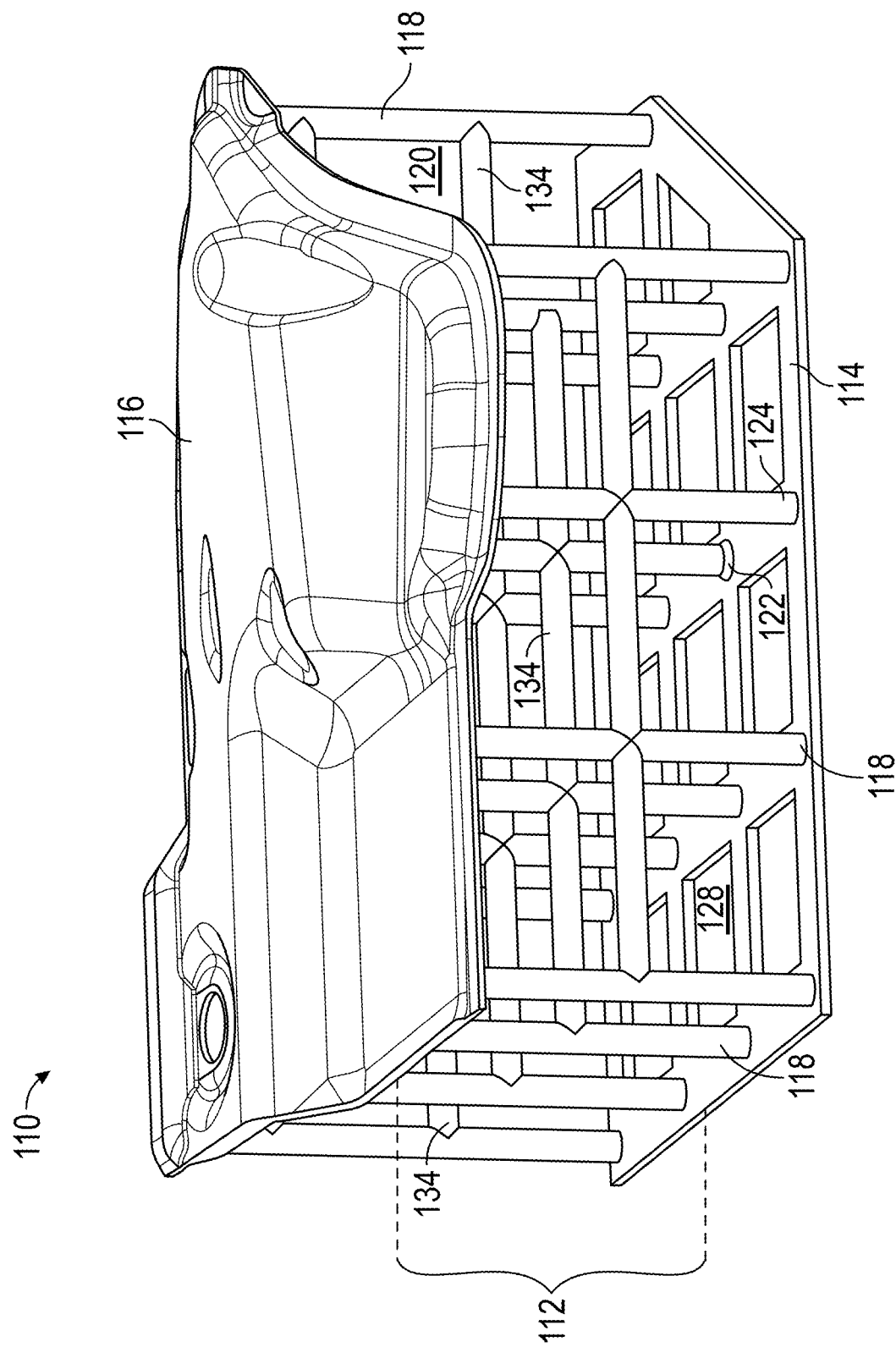
FIGS. 2A-2B: Perspective (FIG. 2A) and side (FIG. 2B) views of an embodiment of a fixture for industrial tooling with a grid of columns having cross members.
Figure 2B:
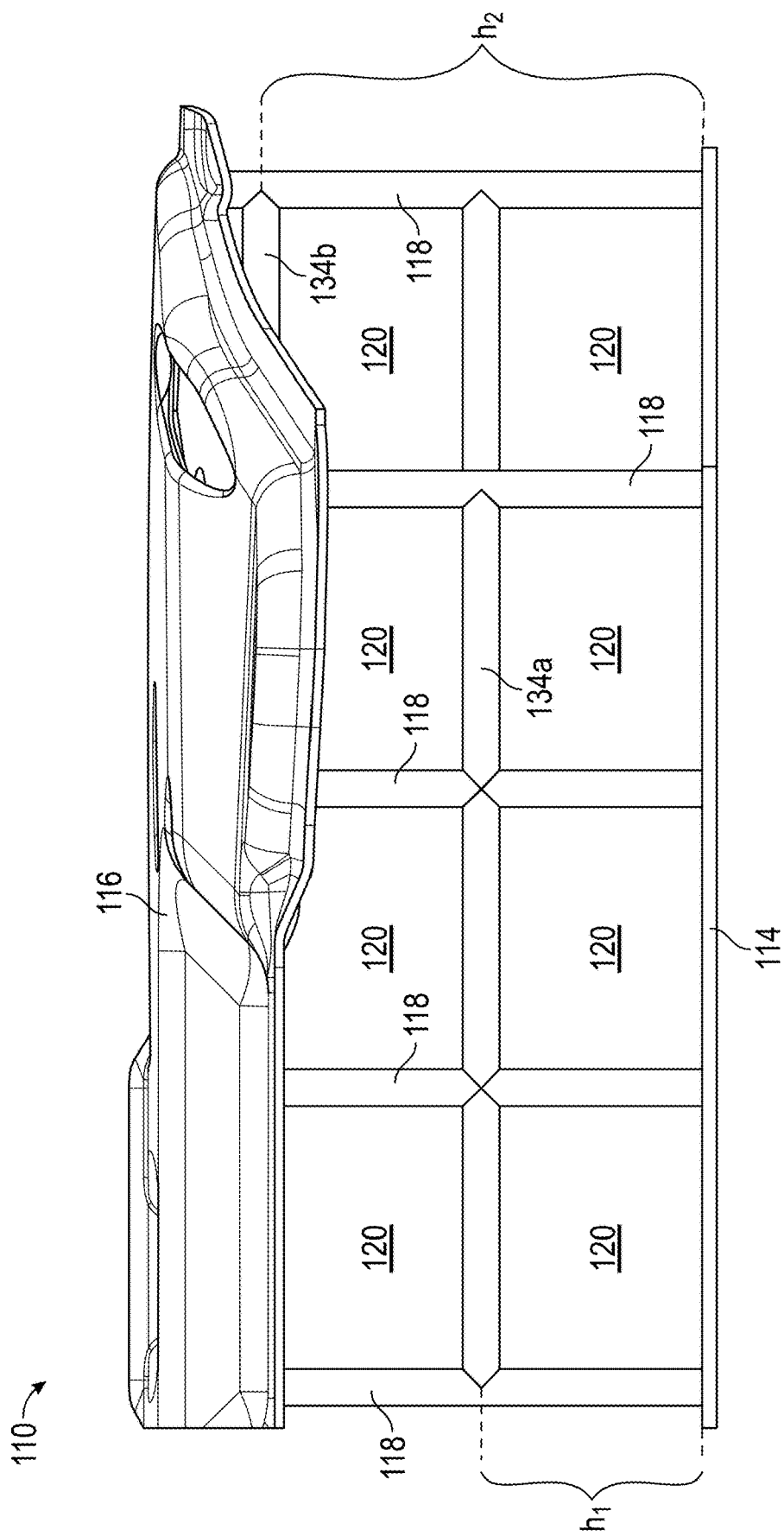

Referring now to FIGS. 2A-2B, an embodiment of a fixture 110 for industrial tooling is shown that is otherwise identical to the embodiment of the fixture 10 depicted in FIGS. 1A-1B, except that the fixture 110 in FIGS. 2A-2B includes a plurality of support columns 118 arranged in an interconnected grid pattern. Accordingly, the support columns 118 may include cross members 134 connecting two or more parallel support columns 118. Each support column 118 may be attached to a cross member 134. Referring now to FIG. 2B, the fixture 110 may include multiple parallel sets of cross members 134. As seen in FIG. 2B, a first set of cross members 134a connects parallel support columns 118 at a first height $h_1$ relative to the base structure 114, and a second set of cross members 134b connects parallel support columns 118 at a second height $h_2$ relative to the base structure 114. As seen in FIG. 2A, because of the geometry of the contoured surface 116 in the illustrated embodiment of the fixture 110, not every support column 118 is connected to a second cross member 134b. The second set of cross members 134b may only be present where the geometry of the contoured surface 116 allows for it. Any number of cross members 134 is possible. As with the previous embodiment, the contoured surface 116 may be produced through a draping method, and the plurality of support columns 118 may be produced by an extrusion nozzle moving vertically up in the z-axis at the rate the polymer is extruding instead of a slicing technique.

In the embodiment depicted in FIGS. 2A-2B, the relative amount of empty space 120 in the intermediate area 112 between the base structure 114 and the contoured surface 116 is somewhat less than in the embodiment depicted in FIGS. 1A-1B, due to the presence of the cross members 134. However, the fixture 110 depicted in FIGS. 2A-2B still includes a significant amount of empty space 120 in the intermediate area 112 between the contoured surface 116 and the base structure 114. The volume of the intermediate area 112 of the fixture 110 may be filled with material up to a density of about 90%, or about 80%, or about 70%, or about 60%, or about 50%, or about 40%, or about 30%, or about 20%. Thus, the intermediate area 112 may include at least 10% empty space 120, or at least 20% empty space 120, or at least 30% empty space 120, or at least 40% empty space 120, or at least 50% empty space 120, or at least 60% empty space 120, or at least 70% empty space 120, or at least 80% empty space 120.

As with the previous embodiment, FIG. 2A depicts a bead 122 of material at a foot section 124 of a support column 118. Such a bead 122 may be present at the foot section 124 of any or all of the support columns 118 of the fixture 118.

Figure 3A:
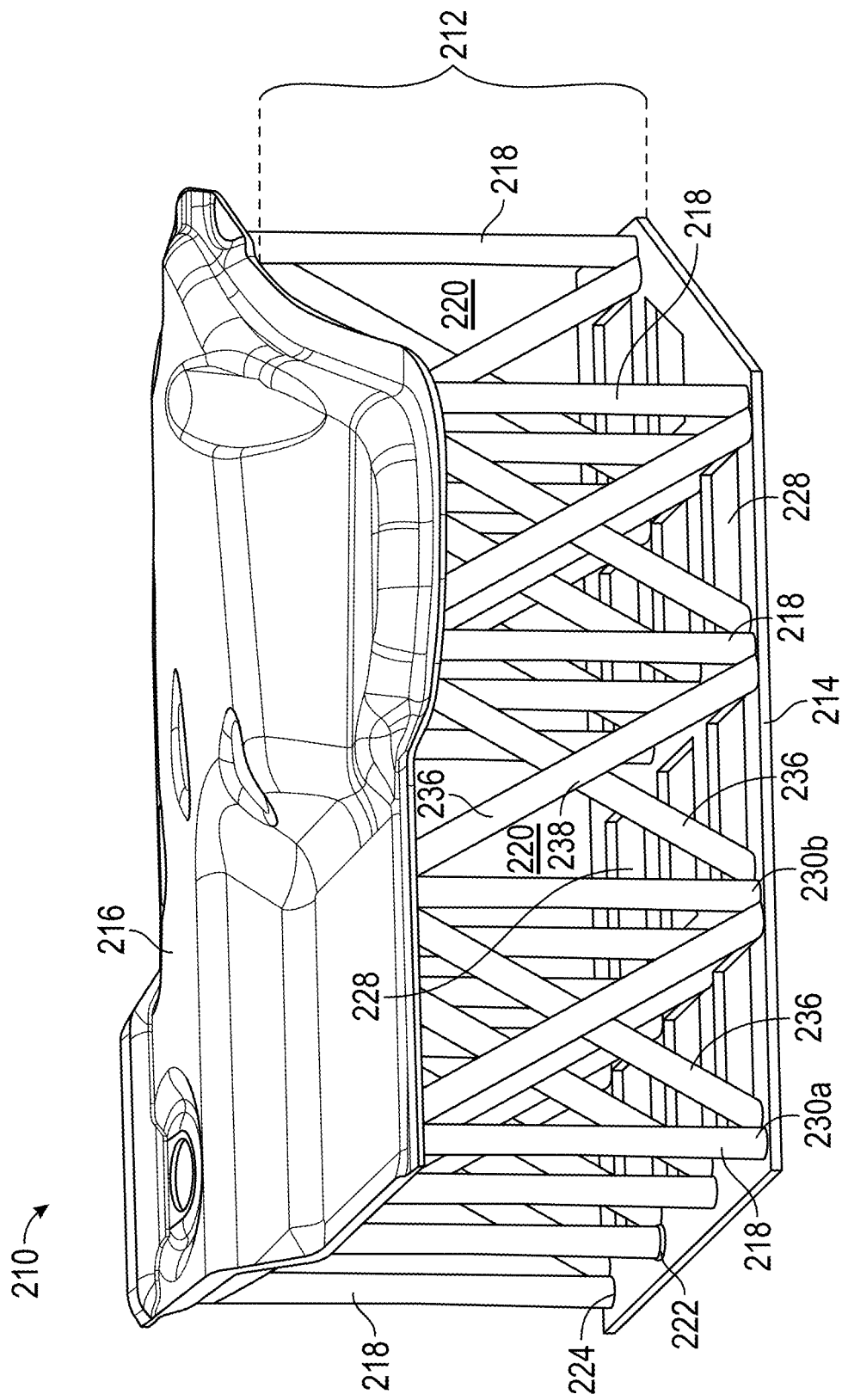
FIGS. 3A-3B: Perspective (FIG. 3A) and side (FIG. 3B) views of an embodiment of a fixture for industrial tooling with support columns including diagonal columns.
Figure 3B:
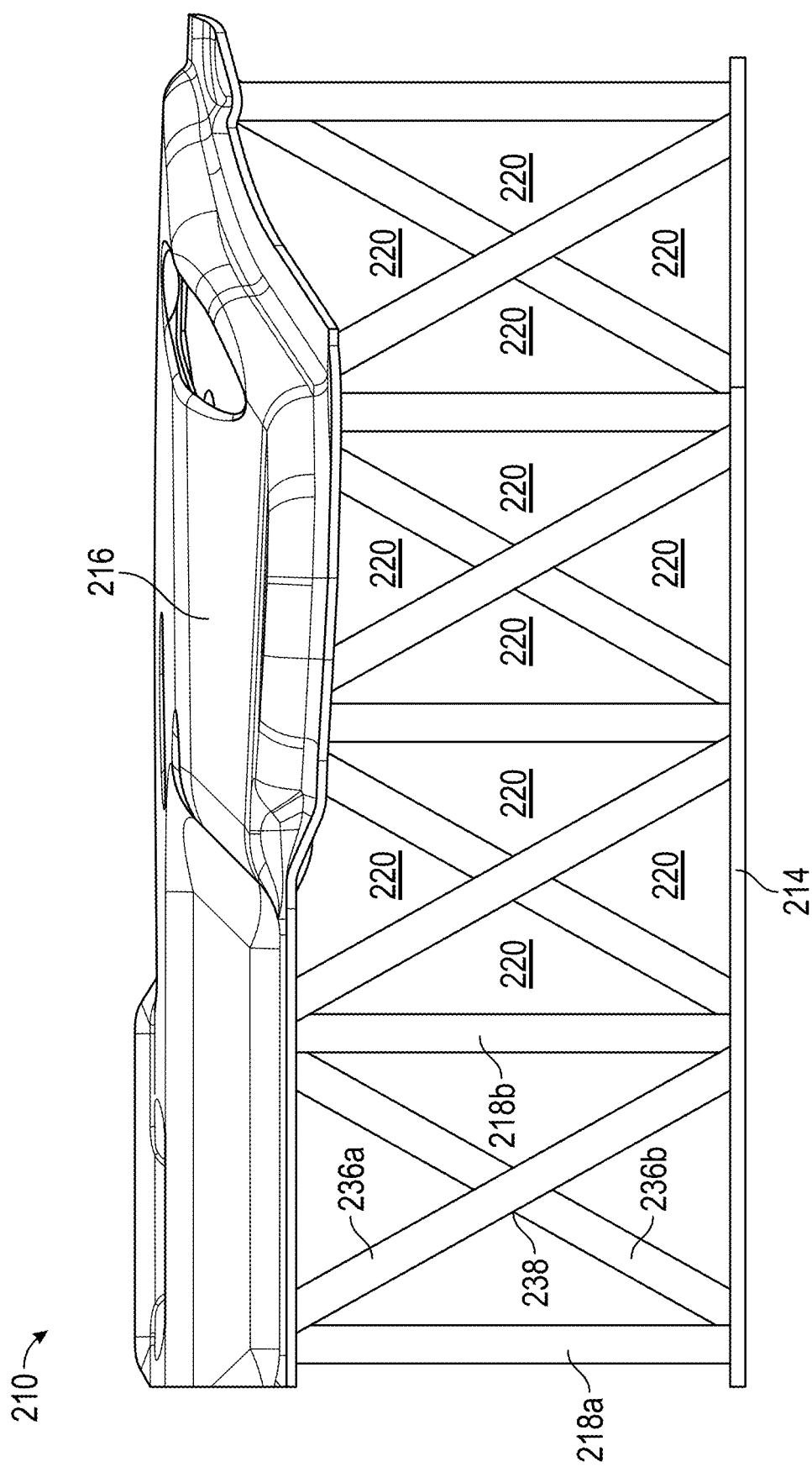

Referring now to FIGS. 3A-3B, an embodiment of a fixture 210 for industrial tooling is shown that includes a plurality of support columns 218 with diagonal columns 236. The plurality of support columns 218 may include a first diagonal column 236a and a second diagonal column 236b between each set of parallel support columns 218. The first diagonal column 236a and the second diagonal column 236b may cross each other between the first support column 218a in the first row 230a of support columns 218 and the first support column 218b in the second row 230b of support columns 218. The first diagonal column 236a and the second diagonal column 236b may cross each other at an approximate midpoint 238 in height between the base structure 214 and the contoured surface 216. There can be parallel sets of diagonal columns 236 between sets of the support columns 218. However, other arrangements and configurations of the plurality of support columns 218 having diagonal columns 236 are possible and encompassed within the scope of the present disclosure. Furthermore, the fixture 210 may further include cross members, such as those depicted in FIGS. 2A-2B, in addition to the diagonal columns 236. As with the previous embodiments, the contoured surface 216 may be produced through a draping method, and the plurality of support columns 218 may be produced by an extrusion nozzle moving vertically up in the z-axis at the rate the polymer is extruding instead of a slicing technique.

Referring still to FIGS. 3A-3B, the diagonal columns 236 provide additional support for the contoured surface 216 relative to the embodiment of the fixture 110 depicted in FIGS. 1A-1B without diagonal columns. Yet, the intermediate area 212 of the fixture 210 may still include a significant amount of empty space 230. The volume of the intermediate area 212 of the fixture 210 may be filled with material up to a density of about 90%, or about 80%, or about 70%, or about 60%, or about 50%, or about 40%, or about 30%, or about 20%. Thus, the intermediate area 212 may include at least 10% empty space 220, or at least 20% empty space 220, or at least 30% empty space 220, or at least 40% empty space 220, or at least 50% empty space 220, or at least 60% empty space 220, or at least 70% empty space 220, or at least 80% empty space 220.

As with the previous embodiments, FIG. 3A depicts a bead 222 of material at a foot section 224 of a support column 218. Such a bead 222 may be present at the foot section 224 of any or all of the support columns 218 of the fixture 218.

Figure 4A:
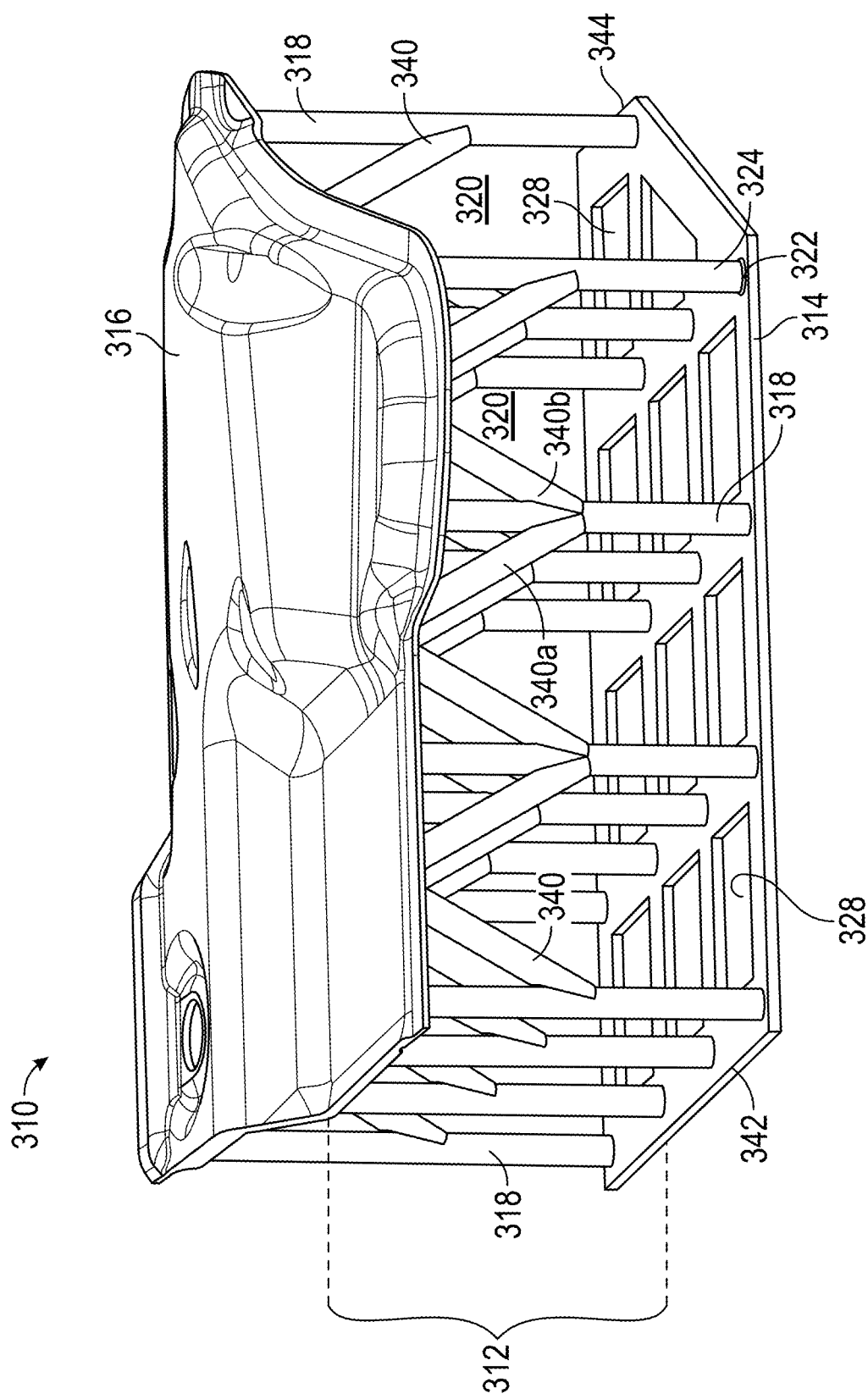
FIGS. 4A-4B: Perspective (FIG. 4A) and side (FIG. 4B) views of an embodiment of a fixture for industrial tooling with support columns having branching members.
Figure 4B:
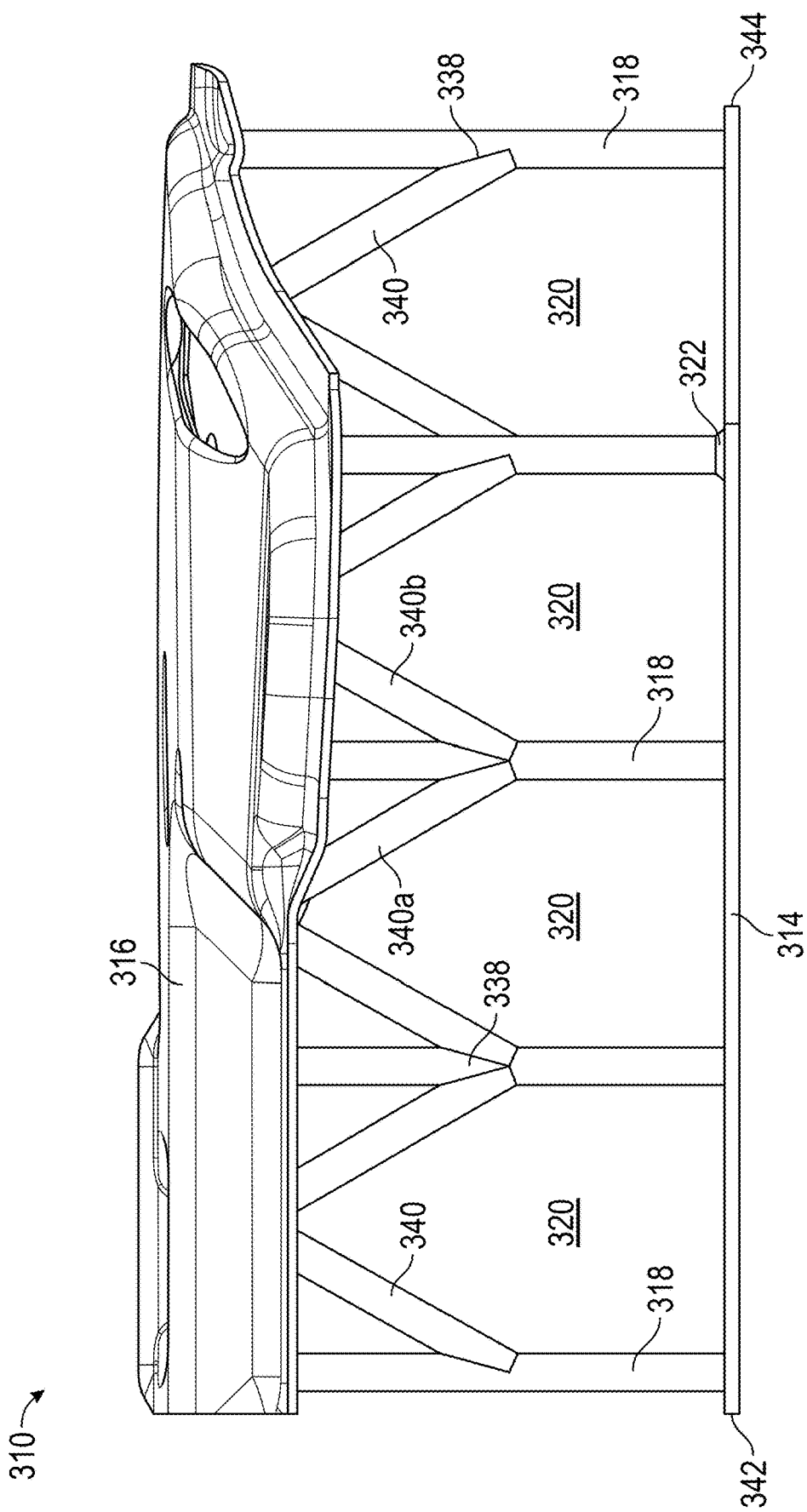

Referring now to FIGS. 4A-4B, a fixture 310 for industrial tooling is shown, and is identical to the embodiment of the fixture 10 depicted in FIGS. 1A-1B except that the plurality of support columns 318 includes support columns 318 having branching members 340. Each support column 318 may include at least one branching member 340 extending to the contoured surface 316 from an approximate midpoint 338 in height between the base structure 314 and the contoured surface 316. In the embodiment depicted in FIGS. 4A-4B, the support columns 318 nearest the first side edge 342 and the second side edge 344 of the fixture 310 include only one branching member 340 each, while the support columns 318 not closest to the first side edge 342 or the second side edge 344 each includes two branching members 340a, 340b. While the branching members 340 are depicted as extending from the approximate midpoint 338 of the support columns 318, this is not necessary, as the branching members 340 may alternatively extend from any height of the support columns 318 relative to the base structure 314. Furthermore, any number or configuration of branching members 340 is possible. Additionally, the fixture 310 may further include cross members and/or diagonal columns as depicted in FIGS. 2-3 and previously described. As with the previous embodiments, the contoured surface 316 may be produced through a draping method, and the plurality of support columns 318 may be produced by an extrusion nozzle moving vertically up in the z-axis at the rate the polymer is extruding instead of a slicing technique.

The embodiment of the fixture 310 depicted in FIGS. 4A-4B allows for more empty space 320 to be created in the intermediate area 312 of the fixture 310 compared to the embodiment of the fixture 210 having diagonal columns 236 depicted in FIGS. 3A-3B, while still achieving additional support from the branching members 340 relative to the embodiment of the fixture 10 depicted in FIGS. 1A-1B without branching members 340 or diagonal columns 236. The volume of the intermediate area 312 of the fixture 310 may be filled with material up to a density of about 90%, or about 80%, or about 70%, or about 60%, or about 50%, or about 40%, or about 30%, or about 20%. Thus, the intermediate area 312 may include at least 10% empty space 320, or at least 20% empty space 320, or at least 30% empty space 320, or at least 40% empty space 320, or at least 50% empty space 320, or at least 60% empty space 320, or at least 70% empty space 320, or at least 80% empty space 320.

As with the previous embodiments, FIGS. 4A-4B depict a bead 322 of material at a foot section 324 of a support column 318. Such a bead 322 may be present at the foot section 324 of any or all of the support columns 318 of the fixture 318.

Figure 5A:
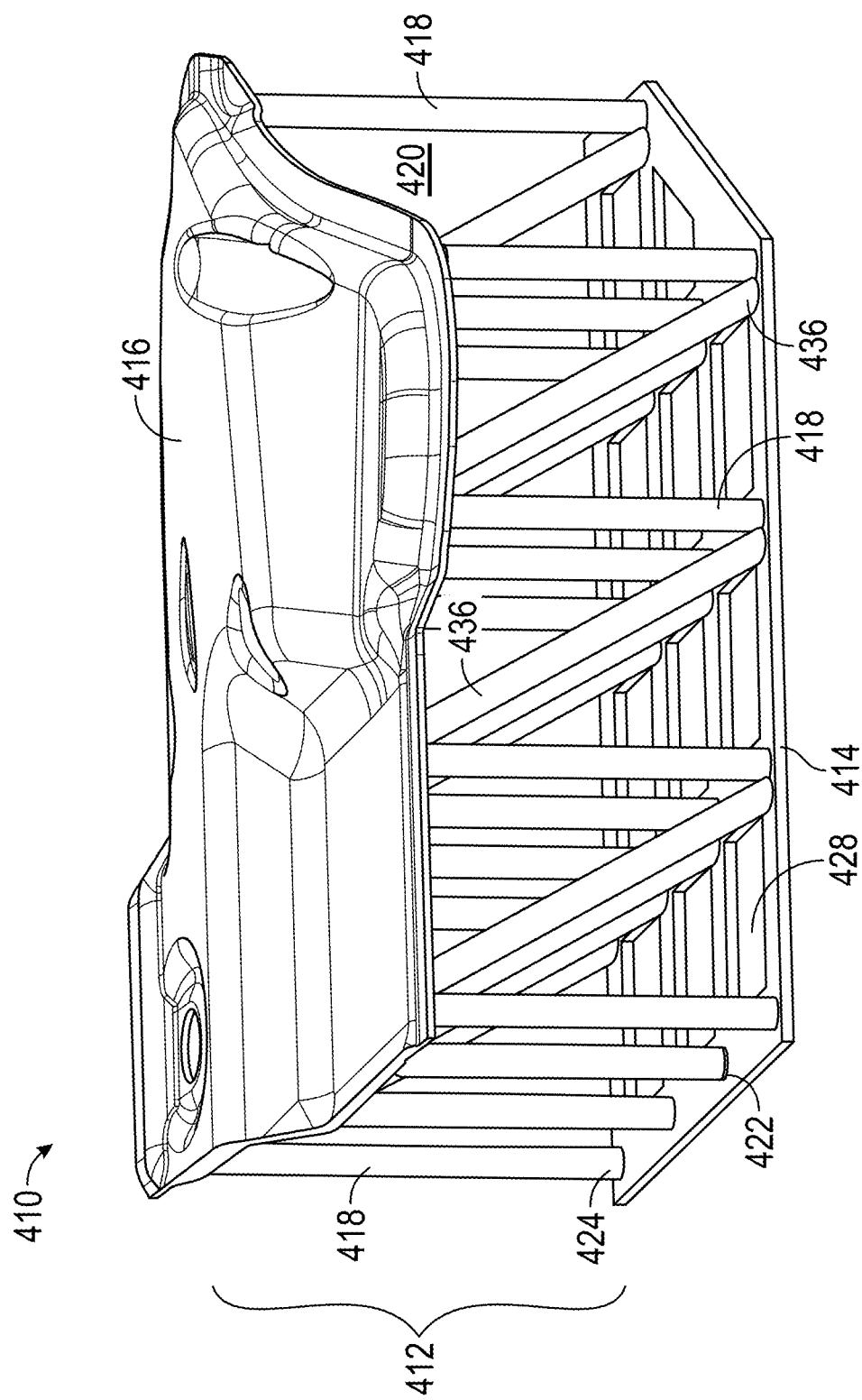
FIGS. 5A-5B: Perspective (FIG. 5A) and side (FIG. 5B) view of an embodiment of a fixture for industrial tooling with a zig zag pattern of support columns.
Figure 5B:
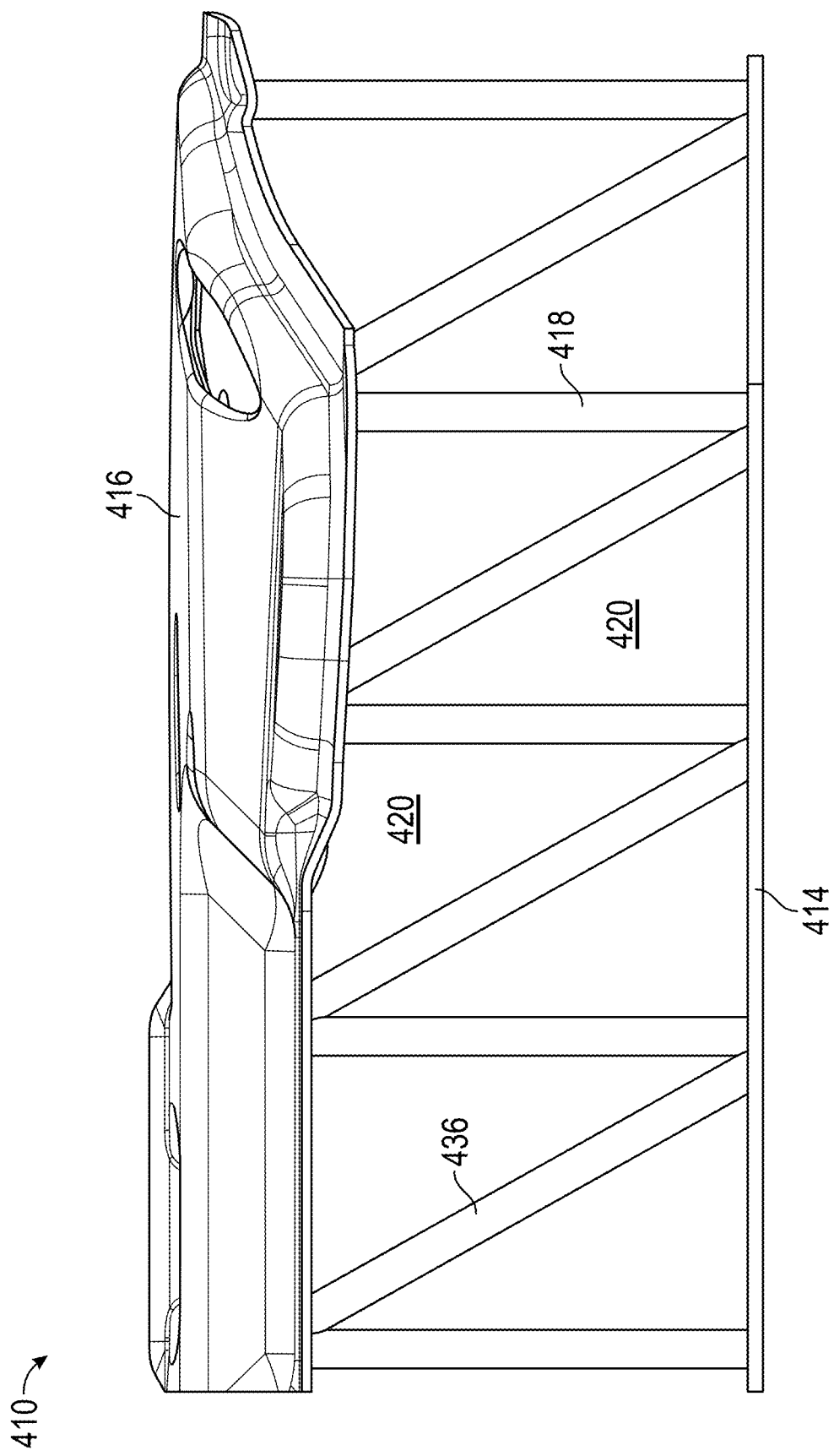

Referring now to FIGS. 5A-5B, a fixture 410 for industrial tooling is shown, and is identical to the embodiment of the fixture 10 depicted in FIGS. 3A-3B except that the plurality of support columns 418 includes one diagonal column 436 between some adjacent support columns 418 instead of two diagonal columns that intersect as depicted in FIGS. 3A-3B. This may be referred to as a zig zag pattern. As with the previous embodiments, the contoured surface 416 may be produced through a draping method, and the plurality of support columns 418 may be produced by an extrusion nozzle moving vertically up in the z-axis at the rate the polymer is extruding instead of a slicing technique.

The embodiment of the fixture 410 depicted in FIGS. 5A-5B allows for more empty space 420 to be created in the intermediate area 412 of the fixture 410 compared to the embodiment of the fixture 210 having diagonal columns 236 depicted in FIGS. 3A-3B, while still achieving additional support from the diagonal members 436 relative to the embodiment of the fixture 10 depicted in FIGS. 1A-1B without diagonal members 436. The volume of the intermediate area 412 of the fixture 410 may be filled with material up to a density of about 90%, or about 80%, or about 70%, or about 60%, or about 50%, or about 40%, or about 30%, or about 20%. Thus, the intermediate area 412 may include at least 10% empty space 420, or at least 20% empty space 420, or at least 30% empty space 420, or at least 40% empty space 420, or at least 50% empty space 420, or at least 60% empty space 420, or at least 70% empty space 420, or at least 80% empty space 420.

As with the previous embodiments, FIG. 5A depicts a bead 422 of material at a foot section 424 of a support column 418. Such a bead 422 may be present at the foot section 424 of any or all of the support columns 418 of the fixture 418.

Figure 6A:
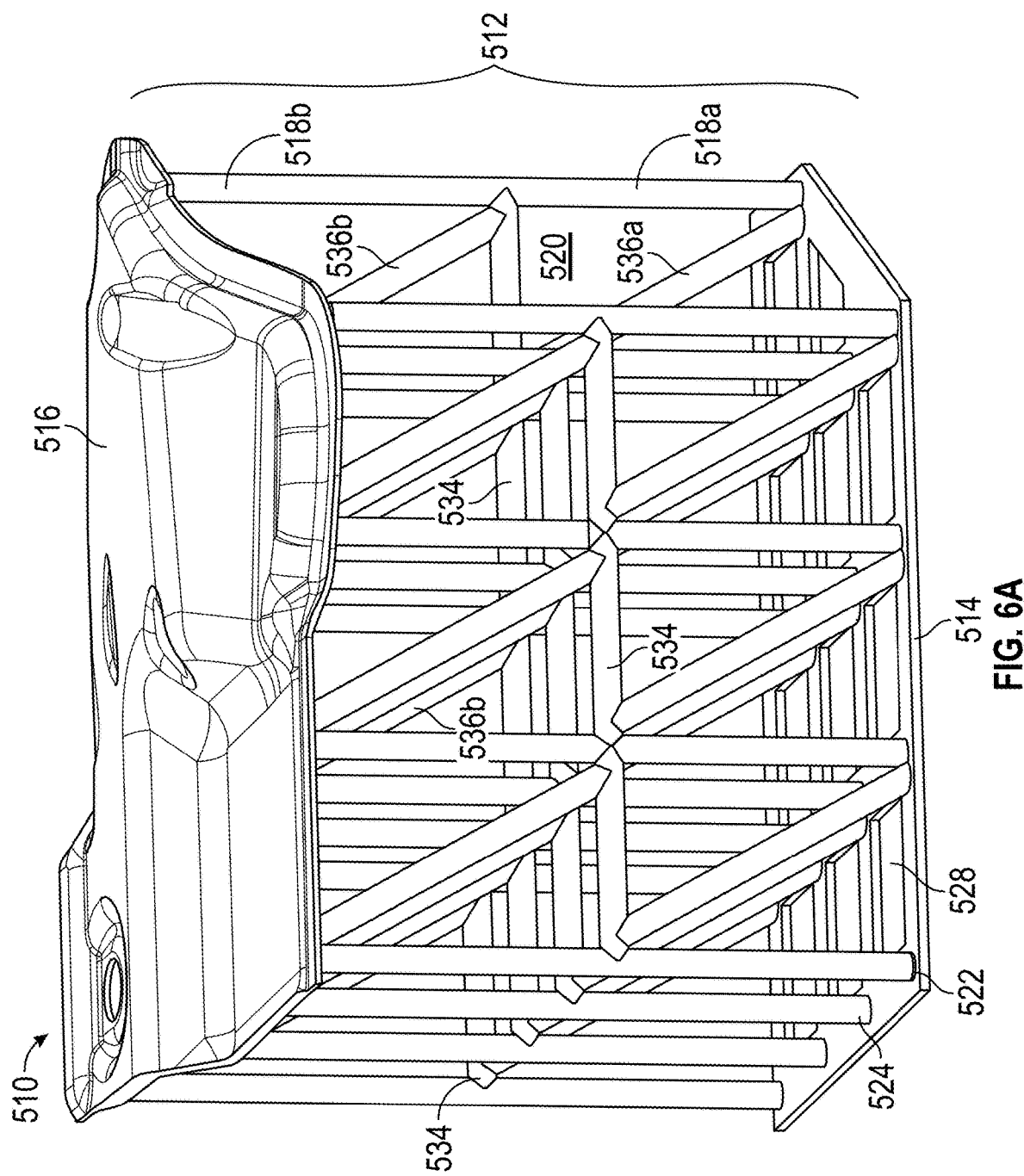
FIGS. 6A-6B: Perspective (FIG. 6A) and side (FIG. 6B) view of an embodiment of a fixture for industrial tooling with a double zig zag pattern of support columns.
Figure 6B:
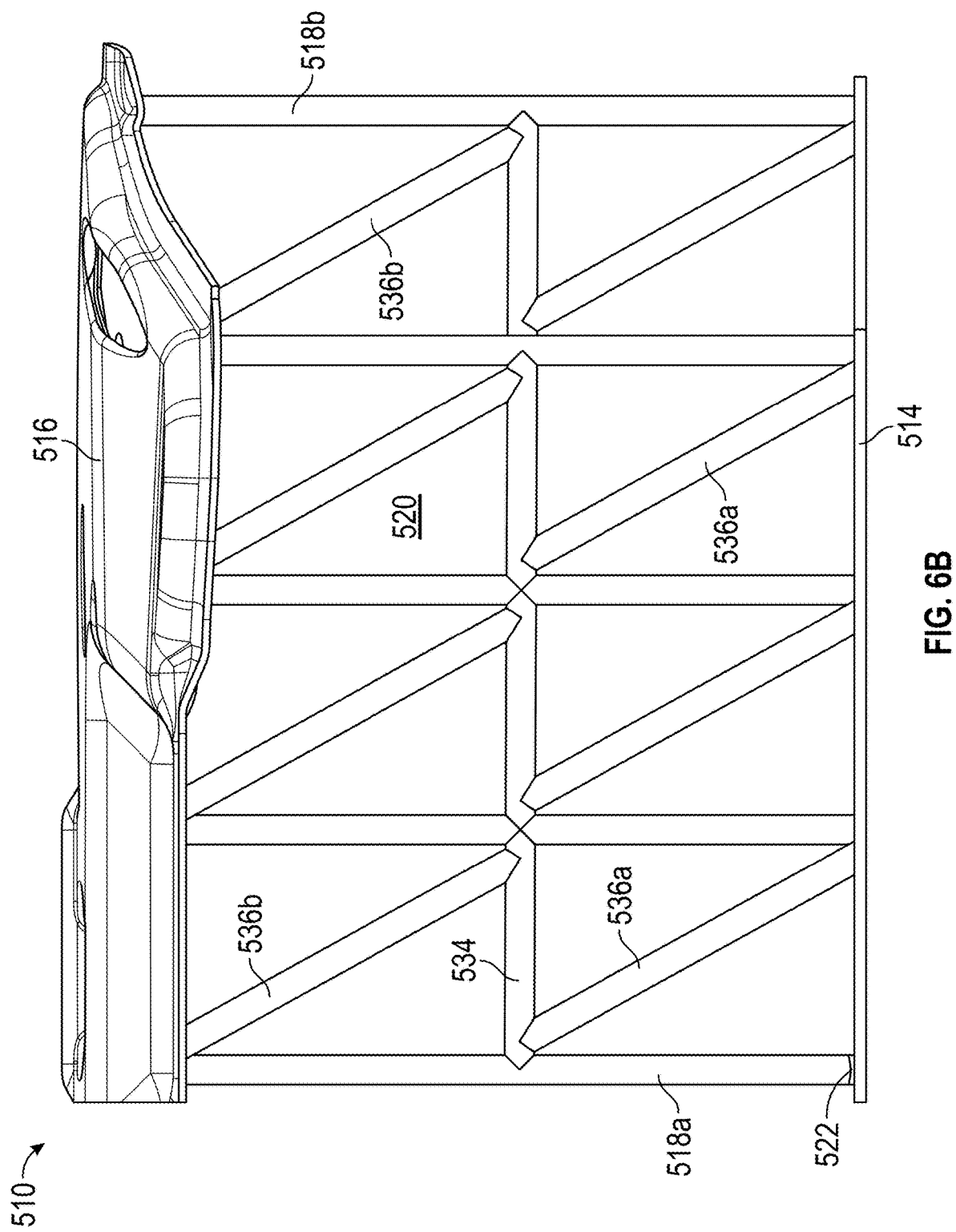

Referring now to FIGS. 6A-6B, a fixture 510 for industrial tooling is shown, and is identical to the embodiment of the fixture 10 depicted in FIGS. 5A-5B except that the plurality of support columns 518 includes a first tier of support columns 518a and diagonal columns 536a and a second tier of support columns 518b and diagonal columns 536b. The first tier support columns 518a and diagonal columns 536a extend from the base member 514 to a cross member 534, and the second tier support columns 518b and diagonal columns 536b extend from the cross member 534 to the contoured surface 516. This may be referred to as a double zig zag pattern. As with the previous embodiments, the contoured surface 516 may be produced through a draping method, and the plurality of support columns 518 may be produced by an extrusion nozzle moving vertically up in the z-axis at the rate the polymer is extruding instead of a slicing technique.

The embodiment of the fixture 510 depicted in FIGS. 6A-6B allows for more empty space 520 to be created in the intermediate area 512 of the fixture 510 compared to the embodiment of the fixture 210 having diagonal columns 236 depicted in FIGS. 3A-3B, while still achieving additional support from the diagonal members 536a, 536b relative to the embodiment of the fixture 10 depicted in FIGS. 1A-1B without diagonal members 536a, 536b. Furthermore, the embodiment of the fixture 510 depicted in FIGS. 6A-6B allows for there to be a greater distance between the base structure 514 and the contoured surface 516 while still maintaining an open lattice structure with significant empty space 520 in the intermediate area 512. The volume of the intermediate area 512 of the fixture 510 may be filled with material up to a density of about 90%, or about 80%, or about 70%, or about 60%, or about 50%, or about 40%, or about 30%, or about 20%. Thus, the intermediate area 512 may include at least 10% empty space 520, or at least 20% empty space 520, or at least 30% empty space 520, or at least 40% empty space 520, or at least 50% empty space 520, or at least 60% empty space 520, or at least 70% empty space 520, or at least 80% empty space 520.

As with the previous embodiments, FIGS. 6A-6B depict a bead 522 of material at a foot section 524 of a support column 518. Such a bead 522 may be present at the foot section 524 of any or all of the support columns 518 of the fixture 518.

For convenience and ease of illustration, the contoured surface 16, 116, 216, 316, 416, 516 depicted in each of FIGS. 1-6 is the same geometry. However, as discussed above, the geometry of the contoured surface is customizable for the desired purpose of the fixture 10, 110, 210, 310, 410, 510. Also, each of the fixtures 110, 210, 310, 410, 510 depicted in FIGS. 2-6 may include openings 128, 228, 328, 428, 528 in the base structure 114, 214, 314, 414, 514 similar to the fixture 10 depicted in FIGS. 1A-1B, which saves on material cost.

As noted above, the fixtures 10, 110, 210, 310, 410, 510 described herein may be manufactured through an additive manufacturing technique involving the use of an extruder in a draping process. An extruder, such as an extruder with a variable diameter tip, may be used to extrude the base structure 14, 114, 214, 314, 414, 514, support columns 18, 118, 218, 318, 418, 518, and contoured surface 16, 116, 216, 316, 416, 516 from the desired polymer(s). Advantageously, the use of a variable diameter tip allows for the production of the components of the fixtures 10, 110, 210, 310, 410, 510 in different layer thicknesses with a single machine.

Figure 11A:
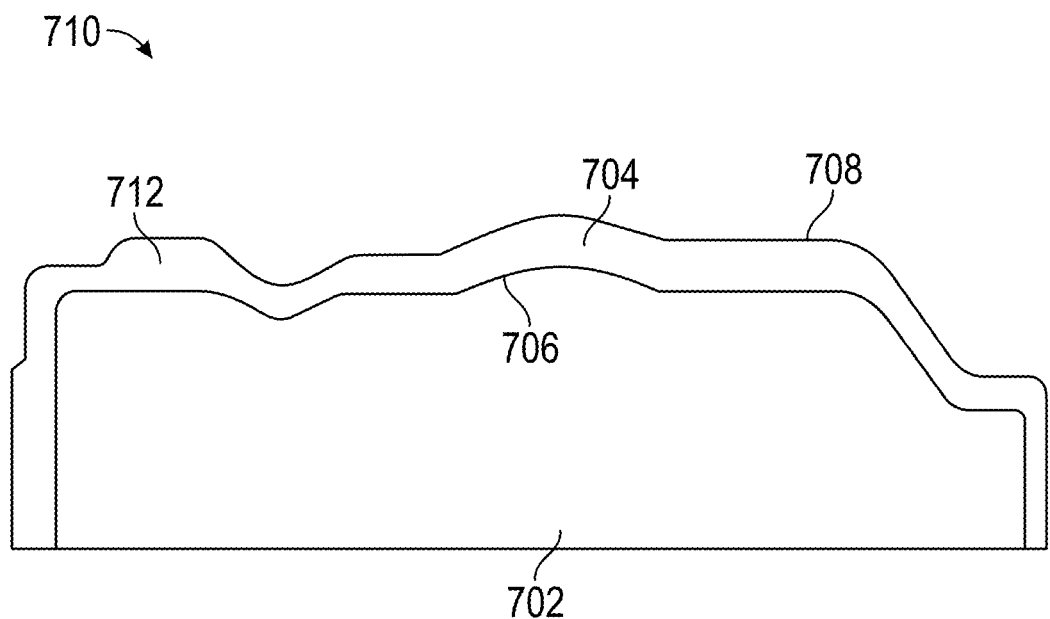
FIGS. 11A-11B: Illustrations of embodiments of a fixture for industrial tooling made by applying an extruded layer over a core of foam, balsawood, or other suitable material through a non-slicing method, without (FIG. 11A) and with (FIG. 11B) a separator.
Figure 11B:
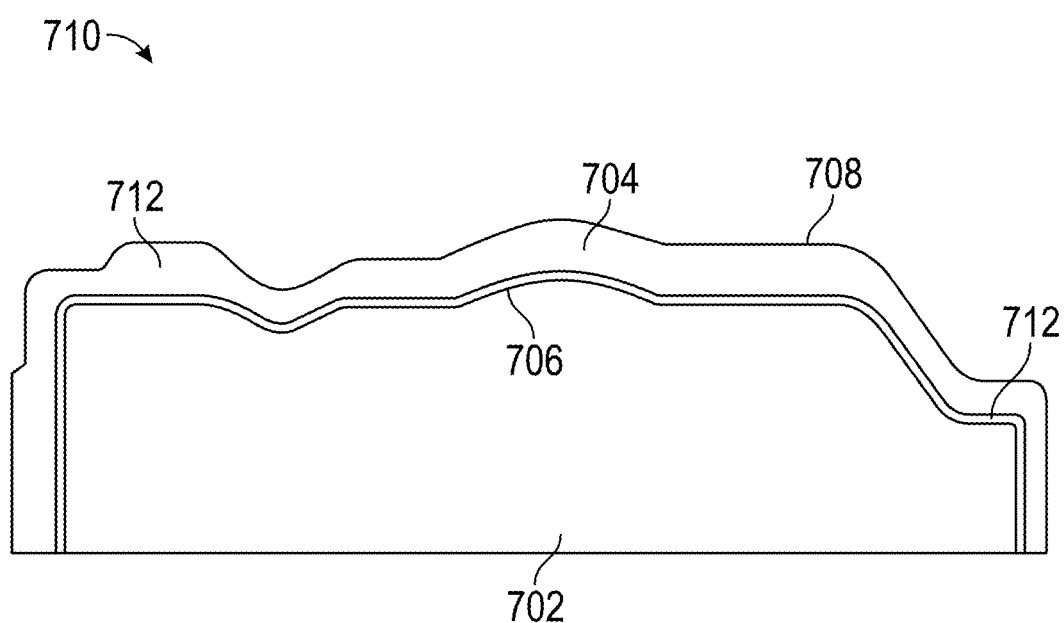
Figure 12A:
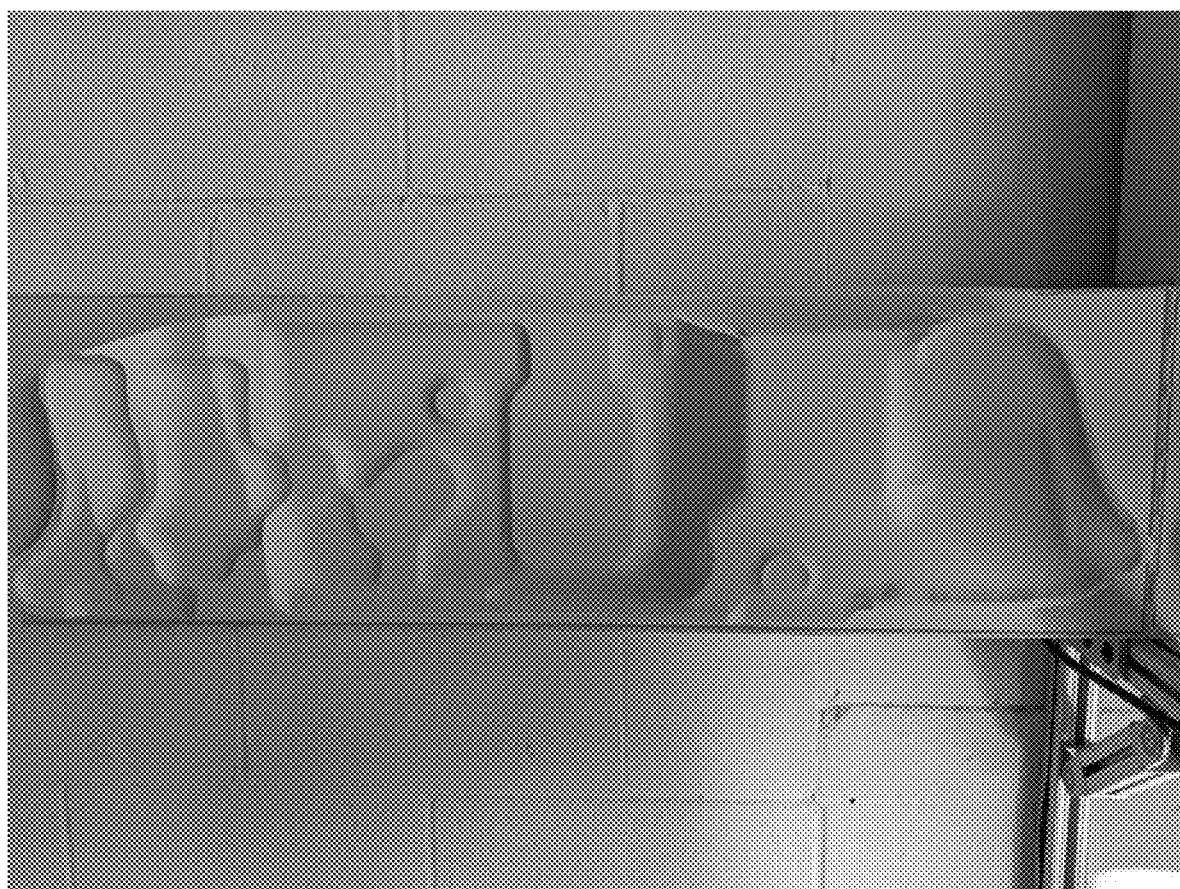
FIGS. 12A-12E: Photographs showing an example fixture for industrial tooling manufactured by applying an extruded layer over a core as described herein.
Figure 12B:
Figure 12C:
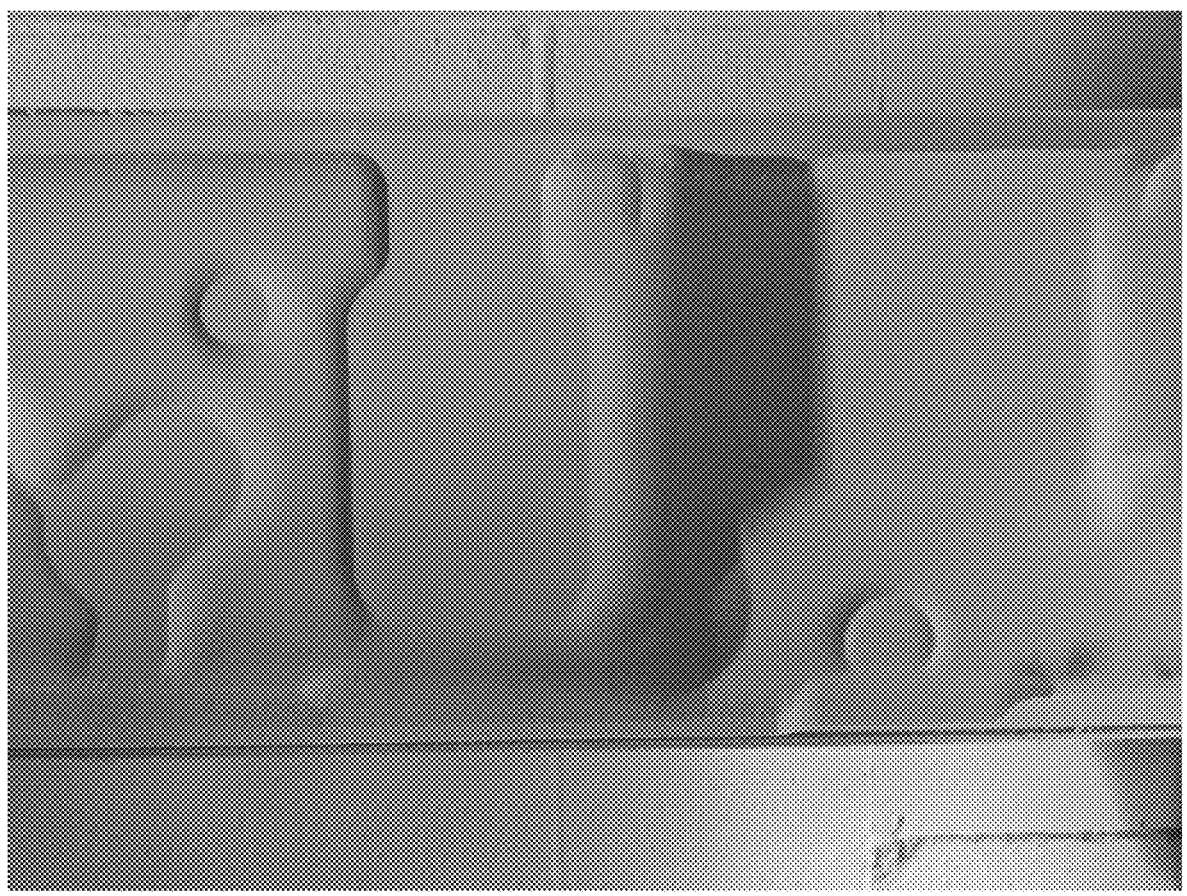
Figure 12D:
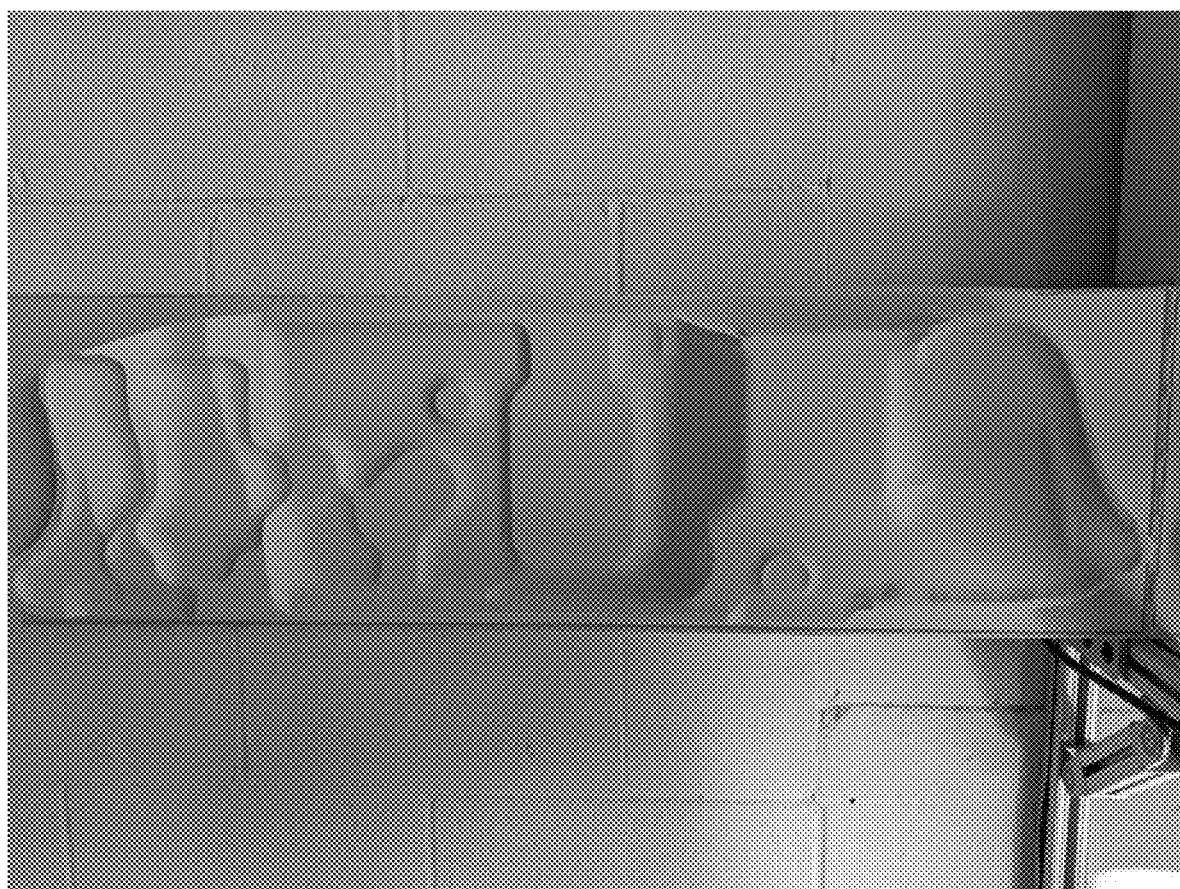
Figure 12E:
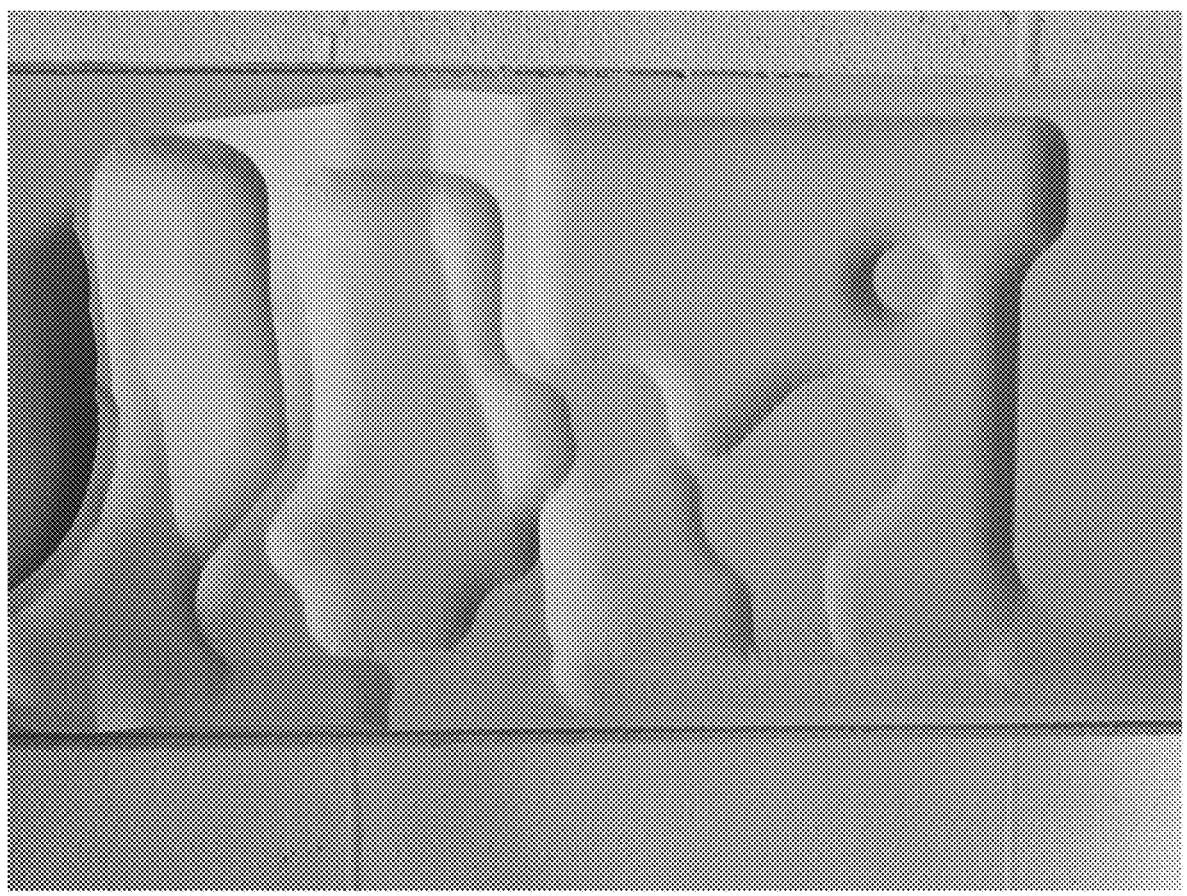

In another embodiment, a fixture or tool may be produced on a core instead of columns. In this manner, a fixture or tool may be produced through another non-slicing method, through a free-form extrusion path method so as to manufacture 3D printed or additive manufactured parts. Referring now to FIGS. 11A-11B, in a non-limiting example method for making a fixture or tool 710, an undersized core 702 or buck of foam, balsawood, or other suitable material, may first be machined, where the shape of the core 702 relates to the finished part but is undersized relative to the finished part to accommodate the thickness of the extruded materials' final desired thickness. After the core 702 is produced, a layer 704 of extruded material suitable for the finished part, such as ABS plastic with carbon filler, may be applied over the core and be supported by the core 702 until cooled. This extruded layer 704 may be slightly oversized to allow it to be machined back to the required tolerance. The path is not slicing-based, but instead may be designed with regards to the quickest deposition to provide the required finish quality. FIGS. 12A-12E show photographs of an example fixture made using this method.

Referring again to FIGS. 11A-11B, the core 702 has a contoured surface 706, and the extruded layer 704 forms a surface 708 that conforms to the contoured surface 706 of the core 702. The surface 708 may exactly conform to the shape of the contoured surface 706, or may substantially conform to the shape of the contoured surface 706, or may only partly conform to the shape of the contoured surface 706. For example, as seen in FIGS. 11A-11B, the extruded layer 704 may include a feature such as a bump 712 that is not present in the contoured surface 706. Thus, it is not strictly necessary that the surface 708 completely and exactly conforms to the contoured surface 706. However, in some embodiments, the surface 708 does completely conform to the contoured surface 706.

This process can occur in a generally automated manner from the development of complete CAD geometry for the undersized core 702, the finished part geometry with required tolerance bands, and additional features such as gridlines, part number, and revision levels, as well as other Ad/Min and technical features as required. The automation can continue with the development of the manufacturing tool paths required for machining the core 702, the deposition of the extruded material 704, machining of the cooled extrusion 704, scribing gridline and nomenclature, and scanning of the fixture 710 to develop an inspection report.

There are numerous benefits to this method. For instance, it allows for the extrusion of complex shapes that are supported without the need of a tediously washed out (secondary process) support material. Furthermore, there is no requirement for a second extrusion head for support material. Machining the lightweight core 702 is much faster and more aggressive than the building up of a printed support material. Referring specifically to FIG. 11B, finished parts built in this manner can be used either with retaining the core 702 or, if desired, a separator 712 can be applied on top of the finished core 702 before the extrusion 704 is applied. The separator 712 can be, for example, a liquid vinyl or other brushed or sprayed-on product. When the extrusion 704 cools and is finished, the core 702 can be removed along with the separator 712, leaving behind a hard, thin shell formed from the extrusion 704. The shell has various possible uses such as a mold for vacuum forming, and as a variety of trim fixtures such as water jet trimming.

Figure 8:
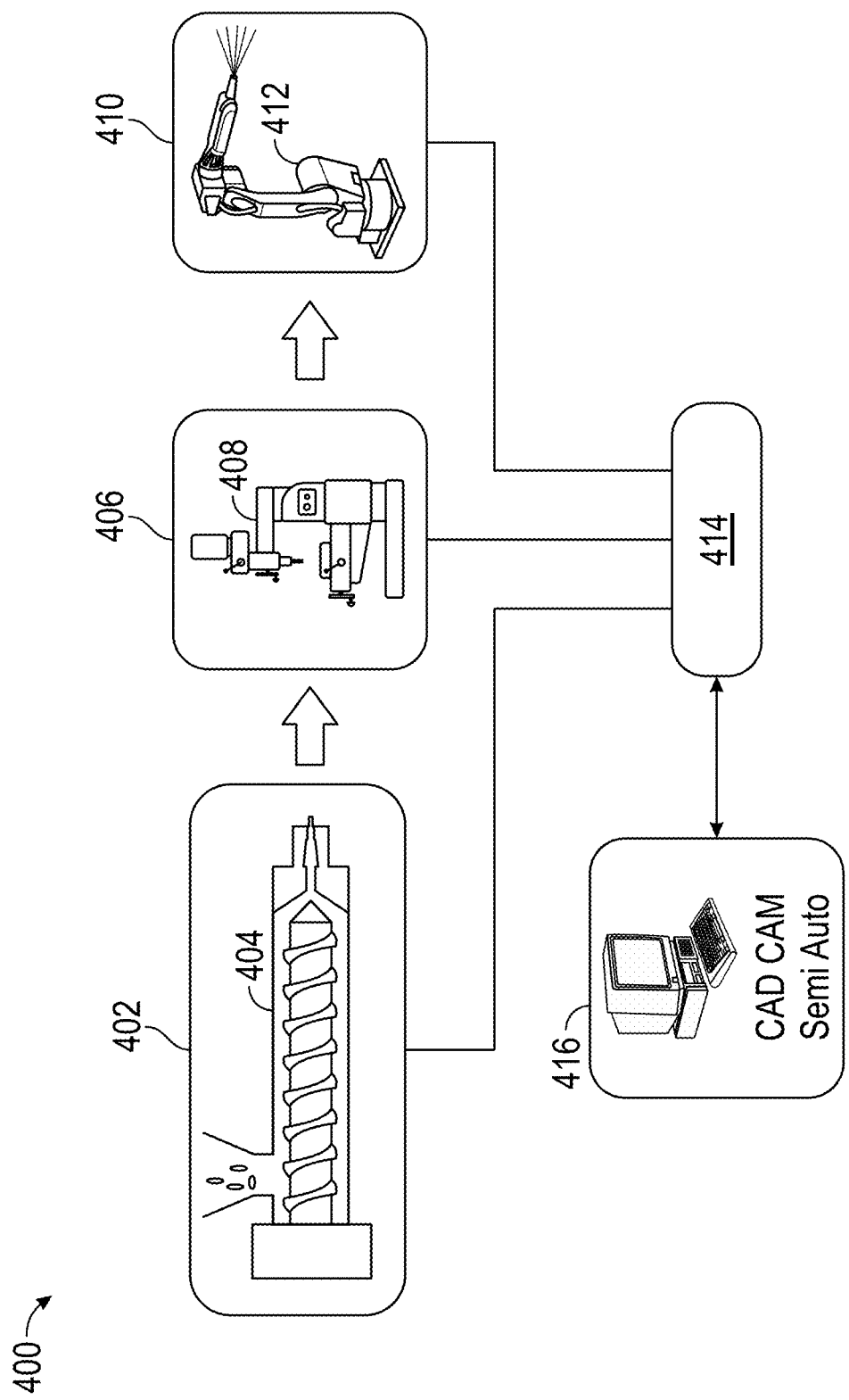
FIG. 8: Illustration of a non-limiting example system and method for manufacturing a fixture for industrial tooling.

Referring now to FIG. 8, further provided herein are a system 400 and method for manufacturing a fixture for industrial tooling. The system 400 may include a plurality of stations that the fixture may sequentially pass through. A first station 402 may include a robotic extruder 404, or other additive manufacturing machine, configured to extrude or otherwise produce a base structure, support columns, and a contoured surface as described herein. The additive manufacturing machine may use the draping method described herein and/or any other suitable process such as, but not limited to, fused deposition modeling (FDM), stereolithography (SLA), selective laser sintering (SLS), or three dimensional (3D) printing. Any such process may be used to build the fixture by localling fusing or curing building materials that may be in powder or liquid form. A plastic filament is unwound from a coil or plastic pellets and supply material to an extrusion nozzle which can turn the flow on and off. The nozzle can be heated to melt the material and can be moved in both horizontal and vertical directions by a numerically controlled mechanism, directly controlled by a computer 414. The fixture can be produced by extruding small beads of thermoplastic material to form layers, columns, or drapes as the material hardens immediately after extrusion from the nozzle.

Referring still to FIG. 8, a second station 406 may include a machining tool 408, such as a milling machine, configured to machine the contoured surface to within one or more desired tolerances. The desired tolerance(s) will depend on the fixture being produced and the intended use thereof.

A third station 410 may include a robotic painting apparatus 412 configured to apply paint to some or all of the fixture. In other embodiments, the third station 410 or one more subsequent stations includes alternative or additional apparatuses for applying a post-production surface modification to the fixture. In some embodiments, the system 400 includes the first station 402 and the second station 406, but does not include the third station 410. Furthermore, in some embodiments, the system 400 may include additional stations for optional processes such as laser scribing or automated inspection of the produced fixture. Thus, for example, the third station 410 or a subsequent fourth or fifth station may include a scribing tool, such as a laser or mechanical scribing tool, or a device such as a scanner to provide an inspection report confirming the fixture meets dimensional requirements. In one non-limiting example, the system 400 includes each of a first station 402 for extrusion, a second station 406 for machining, a third station 410 for painting, a fourth station for scribing, and a fifth station for inspection certification.

Referring still to FIG. 8, the system 400, and each of its constituent components, may be automated and controlled by the computer 414 run by suitable logic. The computer 414 may include one or more processors and memory. The computer 414 may have access to one or more CAD (computer aided design) model files, which are digital representations of parts. The computer 414 may be aided by automated or semi-automated design (CAD) through robotic path generation (CAM) 416. A customized design software capable of translating data (such as required tolerances of the contoured surface) and creating the appropriate surfaces, such as the support columns and draped contoured surfaces described herein, can be employed. The computer 414 may be communicatively coupled to the robotic extruder 404, the machining tool 408, and the robotic painting apparatus 412, and may be configured to control the robotic extruder 404, the machining tool 408, and the robotic painting apparatus 412. The software can create the unique robot paths required to drive and position the robotic extruder 404 and other desired operation. The robotic extruder 404 may be on a movable track to provide additional reach. A thermally controllable platen on which the parts can rest may also be included in the system 400.

In use, material enters the system 400 through a hopper or other entry into the robotic extruder 404, is extruded into a fixture having a base structure, support columns, and a contoured surface as described herein, and then passes to the second station 406 via suitable transport mechanism such as a conveyor or a robotic arm. At the second station 406, the fixture is machined to within the desired tolerances by the machining tool 408. Then, in some embodiments, the machined fixture is transported to the third station 410 by a suitable transport mechanism such as a conveyor or a robotic arm, where the machined fixture may be painted by the robotic painting apparatus 412, or otherwise exposed to a post-production surface treatment as desired. Optionally, the fixture may then be transported to additional stations for further post-production treatments such as scribing. The computer 414 may control the actions of the robotic extruder 404, milling machine 408, and robotic painting apparatus 412, as well as any other machines involved in the manufacturing process. Furthermore, it is understood that, although for simplicity the computer 414 is referred to and depicted in FIG. 8 as being a singular computer, the computer 414 may actually be a plurality of computers working in communication with one another.

The system 400 and associated method may allow for a highly automated process for producing fixtures for industrial tooling. An operator may start the build process and the robotic extrusion, machining, scribing, painting, and/or inspection certification may happen automatically.

In some embodiments, all of the stations of a system may be driven by a single computer controlled robot or computer numerical control (CNC) machining center. The robot or machining center can sequentially store the previously completed device in its cradle and pick up the next device, and so on, until all requirements are completed, moving, for example, from an extruder to a machining tool to a scribing device, and so on. Thus, referring now to FIG. 9A, an example system 500 may include a robot (or machining center) 502 that performs multiple functions instead of transporting the part between multiple stations. The robot 502 may attach and detach various attachments or heads so as to provide desired functionality, for instance by using a gripper 501 on the robot 502. In the embodiment depicted in FIG. 9A, the robot 502 includes an extruder function 504, a milling function 506 with a milling spindle or robotic or CNC milling tool, a laser scribe function 508 with a laser scribe or other scribe tool, a spray painter function 503, and a laser inspection function 512. The robot 502 is communicatively coupled to a computer 514 that controls the robot 502. The robot 502 may switch between functions by changing a tip or head on the robot 502. For example, to perform the extruder function 504, the robot 502 attaches an extrusion nozzle 505 to itself. To perform the milling function 506, the robot 502 attaches a milling spindle 507 to itself. To perform the laser scribe function 508, the robot 502 attaches a laser scribing tool (also known as a laser head) 509 to itself. To perform the spray painter function 503, the robot 502 attaches a paint sprayer 511 to itself. To perform the inspection function 512, the robot 502 attaches a laser scanning head 513 to itself. The computer 514 may control the interchanging of functions by the robot 502. A thermally controllable platen on which the parts can rest may also be included in the system 500.

Figure 9A:
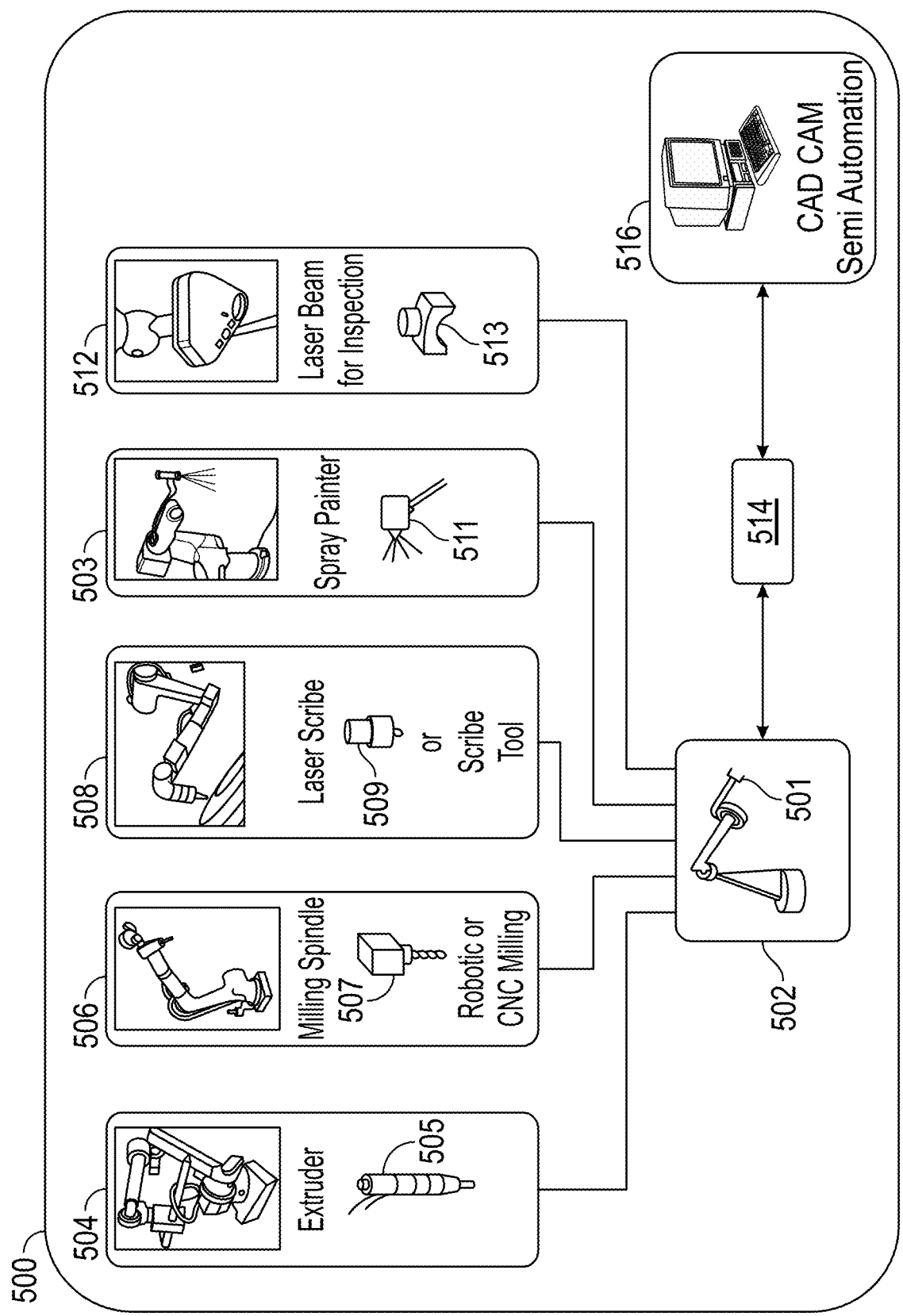
FIGS. 9A-9B: Illustrations of non-limiting example systems and methods for manufacturing a fixture for industrial tooling, with extruded support columns (FIG. 9A) and with a core (FIG. 9B).

Referring still to FIG. 9A, the system 500 may include automated or semi-automated design (CAD) through robotic path generation (CAM) 516, for building a rough part shape by extrusion deposition, then milling to one or more required tolerances, and additional operations as required such as scribing and inspection. In one non-limiting example, the robot 502 controlled by computer driven code first picks up the extrusion nozzle 505 to build the base support structures, column connecting lines, and finally the contoured surface shell. The robot 502 then places the extruder tool 505 in its carriage and picks up a milling spindle 507 with suitable tools. This process progresses until all the requirements specific to that part are complete. This may include the robot 502 picking up a laser scanning head 513, laser scribing tool 509, spray painter 511, or touch probe to inspect the finished contoured surface. Advantageously, the system 500 may be fully or semi-automated, and may use rules developed from the extrusions to further design robot paths and appropriate post-extrusion activity (i.e., milling, painting, inspecting, etc.) for a given fixture.

Figure 9B:
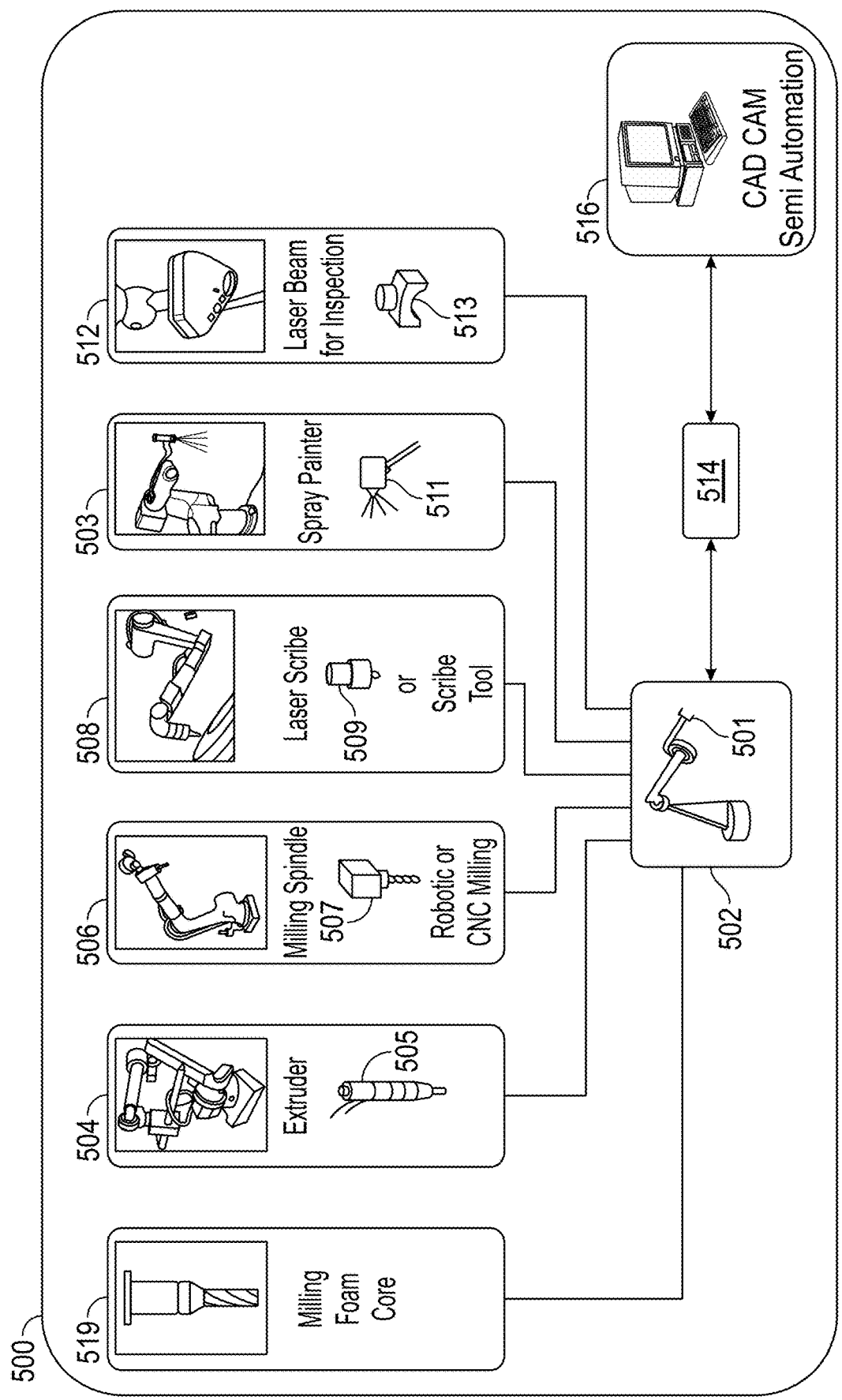

Referring now to FIG. 9B, the system 500 may be configured for manufacturing a fixture having a core instead of support columns, and may further include a milling machine 519 configured to mill a foam or balsawood core 702. As described above in reference to FIGS. 11A-11B, the robot 502 may utilize the milling machine 519 to first machine the core 702, then the robot 502 may utilize the extruder function 504 (such as an extrusion nozzle 505) to extrude a layer 704 of extruded material over the core 702. The robot 502 may pick up the milling spindle 507, laser scanning head 513, laser scribing tool 509, spray painter 511, or a touch probe for inspection as needed to finish, scan, scribe, paint, or inspect the finished contoured surface 708. The system 500 may be fully or semi-automated, and may use rules developed from the extrusions to further design robot paths and appropriate post-extrusion activity (i.e., milling, painting, inspecting, etc.) for a given fixture.

Certain embodiments of the apparatuses, fixtures, systems, and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the apparatuses, fixtures, systems, and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A method for producing a fixture for industrial tooling, the method comprising:
   extruding a base structure, a plurality of support columns on the base structure, and a contoured surface on the plurality of support columns to form a fixture, wherein the plurality of support columns defines an intermediate area between the base structure and the contoured surface having at least 10% empty space; and
   machining the fixture to within a desired tolerance to produce a fixture for industrial tooling;
   wherein the plurality of support columns are extruded and are not formed through a slicing technique; and
   wherein the contoured surface is extruded through a draping method comprising draping a polymer material from a top of a first support column across an open area to a top of a second support column.

2. A method of additive manufacturing, the method comprising:
   extruding a first support column on a base structure with a polymer through a single vertical path of an extruder, wherein either (a) the extruder dwells at a top of the first support column for a sufficient time to allow the extruded polymer to cool to an extent such that the first support column is capable of supporting itself, or (b) an air spray is utilized to cool the extruded polymer to an extent such that the first support column is capable of supporting itself; and
   draping the polymer with the extruder from the first support column to a second support column, leaving an open area between the first support column and the second support column.

3. The method of claim 2, wherein the draping forms a contoured surface supported by the first support column and the second support column.

4. The method of claim 2, wherein the extruding is conducted with an extrusion nozzle having a cross sectional shape of (i) a square with tabs and a center area, or (ii) a circle with tabs and a center area;
   wherein the polymer extruded through the tabs cools first to provide quick support and the polymer extruded through the center area remains softer to receive a bridging or draping line of material.

5. A method of additive manufacturing, the method comprising:
   extruding a plurality of support columns including at least a first support column on a base structure and a second support column on the base structure, wherein the first support column is at a distance from the second support column;
   draping a connecting line of material from a top of the first support column to a top of the second support column, wherein the connecting line of material is draped over an open area for the distance; and
   draping or bridging further lines of material in a manner substantially perpendicular to the connecting line to form a shell supported by the plurality of support columns.

6. The method of claim 5, wherein the extruding is conducted with an extrusion nozzle having a cross sectional shape of (i) a square with tabs and a center area, or (ii) a circle with tabs and a center area;
   wherein the material extruded through the tabs cools first to provide quick support and the material extruded through the center area remains softer to receive a bridging or draping line of material.

7. A method for manufacturing a fixture or tool, the method comprising:
   providing a core having a shape conforming to a desired part, undersized relative to a size of the desired part; and
   extruding a layer of material on the core through a non-slicing process to form an extruded layer having the shape of the desired part;
   wherein the extruded layer is oversized relative to the size of the desired part, and the method further comprises machining the extruded layer to within a desired tolerance.

8. The method of claim 7, further comprising applying a separator on top of the core before the extruding, wherein the core is removable from the extruded layer.

9. A method for manufacturing a fixture or tool, the method comprising:
   providing a core having a shape conforming to a desired part, undersized relative to a size of the desired part; and
   extruding a layer of material on the core through a non-slicing process to form an extruded layer having the shape of the desired part;
   further comprising applying a separator on top of the core before the extruding, wherein the core is removable from the extruded layer; and
   wherein the separator comprises a liquid vinyl or other brushed or sprayed-on product.

10. The method of claim 7, wherein the core comprises a foam or balsawood, and the extruded layer comprises acrylonitrile butadiene styrene (ABS) with a carbon fiber or fiber glass additive, an algae-based polymer, or other extrudable material.

* * * * *